US008743723B2

(12) United States Patent
Watfa et al.

(10) Patent No.: US 8,743,723 B2
(45) Date of Patent: Jun. 3, 2014

(54) METHODS, APPARATUS AND SYSTEMS FOR APPLYING ALMOST BLANK SUBFRAME (ABS) PATTERNS

(75) Inventors: Mahmoud Watfa, Saint Leonard (CA); Diana Pani, Montreal (CA); Paul Marinier, Brossarc (CA); Marian Rudolf, Montreal (CA); Pascal M. Adjakple, Great Neck, NY (US); Stephen E. Terry, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 285 days.

(21) Appl. No.: 13/283,935

(22) Filed: Oct. 28, 2011

(65) Prior Publication Data

US 2012/0113843 A1 May 10, 2012

Related U.S. Application Data

(60) Provisional application No. 61/410,658, filed on Nov. 5, 2010, provisional application No. 61/523,146, filed on Aug. 12, 2011.

(51) Int. Cl.
*G01R 31/08* (2006.01)

(52) U.S. Cl.
USPC .......................................... 370/252; 370/329

(58) Field of Classification Search
None
See application file for complete search history.

(56) References Cited

U.S. PATENT DOCUMENTS

| 2011/0275394 A1* | 11/2011 | Song et al. ............. 455/509 |
| 2011/0310830 A1* | 12/2011 | Wu et al. ............... 370/329 |
| 2012/0106476 A1* | 5/2012 | Song et al. ............. 370/329 |
| 2012/0113843 A1* | 5/2012 | Watfa et al. ............ 370/252 |
| 2012/0147826 A1* | 6/2012 | Teck et al. ............. 370/329 |
| 2012/0147827 A1* | 6/2012 | Wu ....................... 370/329 |
| 2012/0149362 A1* | 6/2012 | Tooher et al. .......... 455/423 |

OTHER PUBLICATIONS

"International Search Report and Written Opinion", PCT/US2011/058253, 8 pages.
"Invitation to Pay Additional Fees and, Where Applicable, Protest Fee; Annex to Form PCT/ISA/206: Communication Relating to the Results of the Partial International Search", PCT/US2011/058153, Dec. 23, 2011, 8 pages.
Alcatel-Lucent et al., "Further Considerations of Time Domain Approach", 3GPP TSG RAN WG1 Meeting #62, Madrid, Spain, R1-104416, Aug. 18, 2010, 8 pages.
Catt, "Considerations on Time Domain Solution in Macro-Pico", 3GPP TSG-RAN WG1 62bis, Xi'an, China, R1-105183, Oct. 11-15, 2010, 10 pages.
Ericsson et al., "Consideration on CSI requirements and tests", 3GPP TSG-RAN WG4 Meeting #60bis, R4-115230, Zhuhai, China, Oct. 10-16, 2011, 2 pages.

(Continued)

*Primary Examiner* — Robert Wilson
(74) *Attorney, Agent, or Firm* — Eric Berkowitz

(57) ABSTRACT

Methods, apparatus, and systems using almost blank subframes patterns are disclosed. Different ABS patterns and triggers are described for enabling a wireless transmit/receive unit (WTRU) to obtain ABS patterns. One representative method of scheduling operations by a wireless transmit/receive unit (WTRU) may include the WTRU receiving information indicating the ABS pattern with a plurality of ABS intervals of an interfering cell; determining timing associated with the ABS intervals of the interfering cell in accordance with the indicated ABS pattern; and scheduling a measurement opportunity, a transmission opportunity or a reception opportunity during the ABS intervals of the interfering cell.

28 Claims, 8 Drawing Sheets

(56) References Cited

OTHER PUBLICATIONS

Ericsson, "Details of almost blank subframes", 3GPP TSG-RAN WG1 62bis, Xian, China, R1-105335, Oct. 14, 2010, 6 pages.

Ericsson et al., "Enhanced ICIC for Co-Channel CSG Deployments", 3GPP TSG-RAN WG1 #62, Madrid, Spain, R1-104864, Aug. 19, 2010, 5 pages.

Ericsson et al., "On Macro-Femto interference handling", 3GPP TSG-RAN WG1 62bis, Xian, China, R1-105337, Oct. 11-15, 2010, 4 pages.

Ericsson et al., "Way Forward on non-MBSFN with colliding CRS", TSG RAN WG4 meeting #60-BIS, R4-115221, Zhuhai, China, Oct. 10-14, 2011, 2 pages.

Intel Corporation, "Consideration on ABS patterns for eICIC demodulation and CSI tests", 3GPP TSG-RAN WG4 Meeting #60bis, R4-115086, Zhuhai, China, Oct. 10-14, 2011, 4 pages.

Motorola, "RACH Aided Initiation of eICIC", 3GPP TSG RAN #62bis, Xian, China, R1-105717, Oct 14, 2010, 3 pages.

NEC, "Further considerations on ABS pattern design", 3GPP TSG-RAN WG4 Meeting #60bis, R4-115130, Zhuhai, China, Oct. 10-14, 2011, 2 pages.

New Postcom, "Further Considerations on Macro-Femto eICIC", 3GPP TSG RAN WG1 Meeting #62bis, Xi'an, China, R1-105224, Oct. 4, 2010, 3 pages.

Nokia Corporation et al., "On Resource Partitioning Between Macro and HeNBs", 3GPP TSG-RAN WG4 Meeting #56, Madrid, Spain, R4-102978, Aug. 17, 2010, 9 pages.

NTT Docomo, "Views on eICIC Schemes for Rel-10", 3GPP TSG-RAN WG1 62bis, Xian, China, R1-105724, Oct. 11-15, 2010, 9 pages.

Qualcomm Incorporated, "Details of time-domain extension of Rel-8/9 backhaul-based ICIC", 3GPP TSG-RAN WG1 62bis, Xi'an, China, R1-105587, Oct. 11-15, 2010, 4 pages.

RAN1, "LS on time-domain extension of Rel 8/9 backhaul-based ICIC for Macro-Pico scenario", 3GPP TSG-RAN WG1 62bis, Xi'an, China, R1-105793, Oct. 11-15, 2010, 2 pages.

\* cited by examiner

610 — ACQUIRE, BY THE WTRU, ABS INFORMATION OF A TARGET CELL INDICATING AN ABS PATTERN HAVING A PLURALITY OF ABS INTERVALS

↓

620 — DETERMINE, BY THE WTRU, WHETHER TO INITIATE USING THE ACQUIRED ABS PATTERN FOR TIMING OF COMMUNICATIONS BASED ON THE ACQUIRED ABS INFORMATION

↓

630 — SCHEDULE, BY THE WTRU, TRANSMISSION OR RECEPTION BASED ON THE ABS PATTERN, RESPONSIVE TO A DETERMINATION TO INITIATE USING THE ACQUIRED ABS PATTERN

510 — DETERMINE, BY THE WTRU, WHETHER THE FURTHER CELL IS INTERFERING WITH COMMUNICATIONS BETWEEN THE WTRU AND THE SERVING CELL

↓

520 — IN RESPONSE TO A DETERMINATION THAT THE FURTHER CELL IS INTERFERING WITH THE COMMUNICATIONS, (1) DETERMINE AN ABS PATTERN OF THE SUBFRAMES AND TIMING OFFSET OF THE FURTHER CELL; (2) NOTIFY, BY THE WTRU, THE SERVING CELL OF THE ABS PATTERN AND TIMING OFFSET OF THE FURTHER CELL; AND (3) OPERATE, BY THE WTRU, IN A FIRST MODE IN ACCORDANCE WITH THE DETERMINED ABS PATTERN AND OFFSET OF THE FURTHER CELL

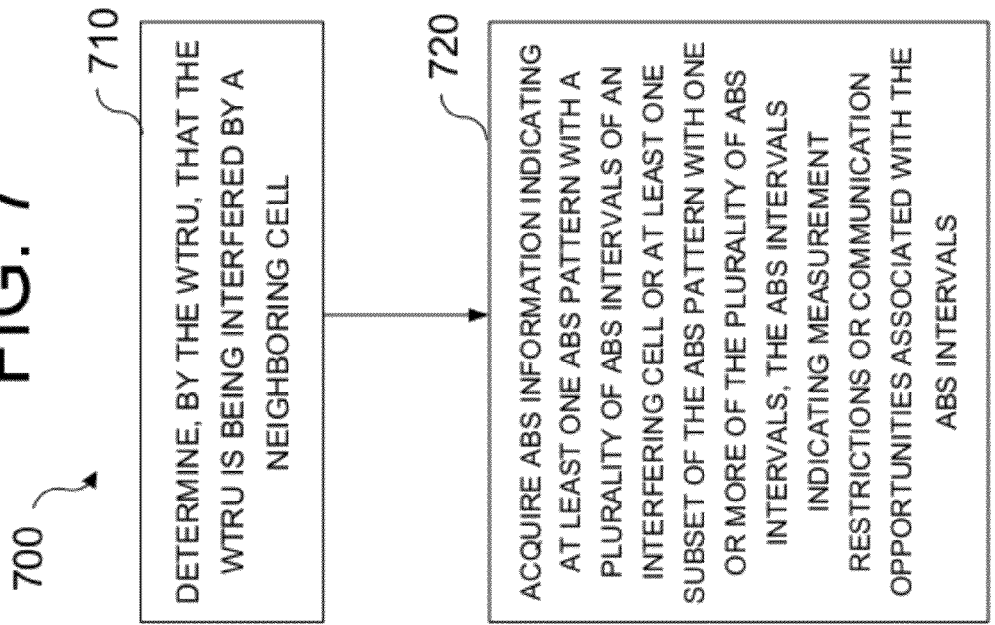

METHODS, APPARATUS AND SYSTEMS FOR APPLYING ALMOST BLANK SUBFRAME (ABS) PATTERNS

CROSS REFERENCE TO RELATED APPLICATIONS

This application claims priority from U.S. Provisional Application No. 61/410,658, filed on Nov. 5, 2010 and U.S. Provisional Application No. 61/523,146, filed on Aug. 12, 2011, the contents of each are incorporated by reference herein.

FIELD OF INVENTION

This application is related to wireless communications, and more specifically to methods for applying Almost Blank Subframe (ABS) patterns.

BACKGROUND

Interference may occur between large area macro cells and small area cells.

SUMMARY

One representative method of scheduling operations by a wireless transmit/receive unit (WTRU) using an almost blank subframe (ABS) pattern is disclosed. The method may include receiving, by the WTRU, ABS information indicating the ABS pattern with a plurality of ABS intervals of an interfering cell; determining, by the WTRU, timing associated with the ABS intervals of the interfering cell in accordance with the indicated ABS pattern; and scheduling, by the WTRU, a measurement opportunity, a transmission opportunity or a reception opportunity during the ABS intervals of the interfering cell.

Another representative method of managing operation of a wireless transmit/receive unit (WTRU) served by a serving cell in a vicinity of a further cell is disclosed. The method may include determining, by the WTRU, whether the further cell is interfering with communications between the WTRU and the serving cell; and in response to a determination that the further cell is interfering with the communications, (1) determining an ABS pattern of the subframes and timing offset of the further cell; (2) notifying, by the WTRU, the serving cell of the ABS pattern and timing offset of the further cell; and (3) operating, by the WTRU in a first mode in accordance with the determined ABS pattern and offset of the further cell.

A further representative method of scheduling transmission or reception by a wireless transmit/receive unit (WTRU) using almost blank subframe (ABS) patterns is disclosed. The method may include acquiring, by the WTRU, ABS information of a target cell indicating an ABS pattern having a plurality of ABS intervals; determining, by the WTRU, whether to initiate using the acquired ABS pattern for timing of communications based on the acquired ABS information; and scheduling, by the WTRU, a measurement, a transmission or a reception based on the ABS pattern, responsive to a determination to initiate using the acquired ABS pattern.

One representative wireless transmit/receive unit (WTRU) configured to use an almost blank subframe (ABS) pattern is disclosed. The WTRU may include a transmit/receive unit configured to receive information indicating the ABS pattern with a plurality of ABS intervals of an interfering cell; and a processor configured to determine timing associated with the ABS intervals of the interfering cell in accordance with the indicated ABS pattern; and to schedule a measurement opportunity, a transmission opportunity, or a reception opportunity during the ABS intervals of the interfering cell.

Another representative WTRU using almost blank subframe (ABS) patterns is disclosed. The WTRU may include a transmit/receive unit configured to acquire ABS information of a target cell indicating an ABS pattern having a plurality of ABS intervals; and a processor configured to: (1) determine whether to initiate using the acquired ABS pattern for timing of communications based on the acquired ABS information; and (2) schedule a measurement, a transmission or a reception based on the ABS pattern, responsive to a determination to initiate using the acquired ABS pattern.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 5 is a flowchart illustrating a further representative method;

FIG. 6 is a flowchart illustrating an additional representative method; and

FIG. 7 is a flowchart illustrating yet another representative method.

DETAILED DESCRIPTION

Figure 1A:
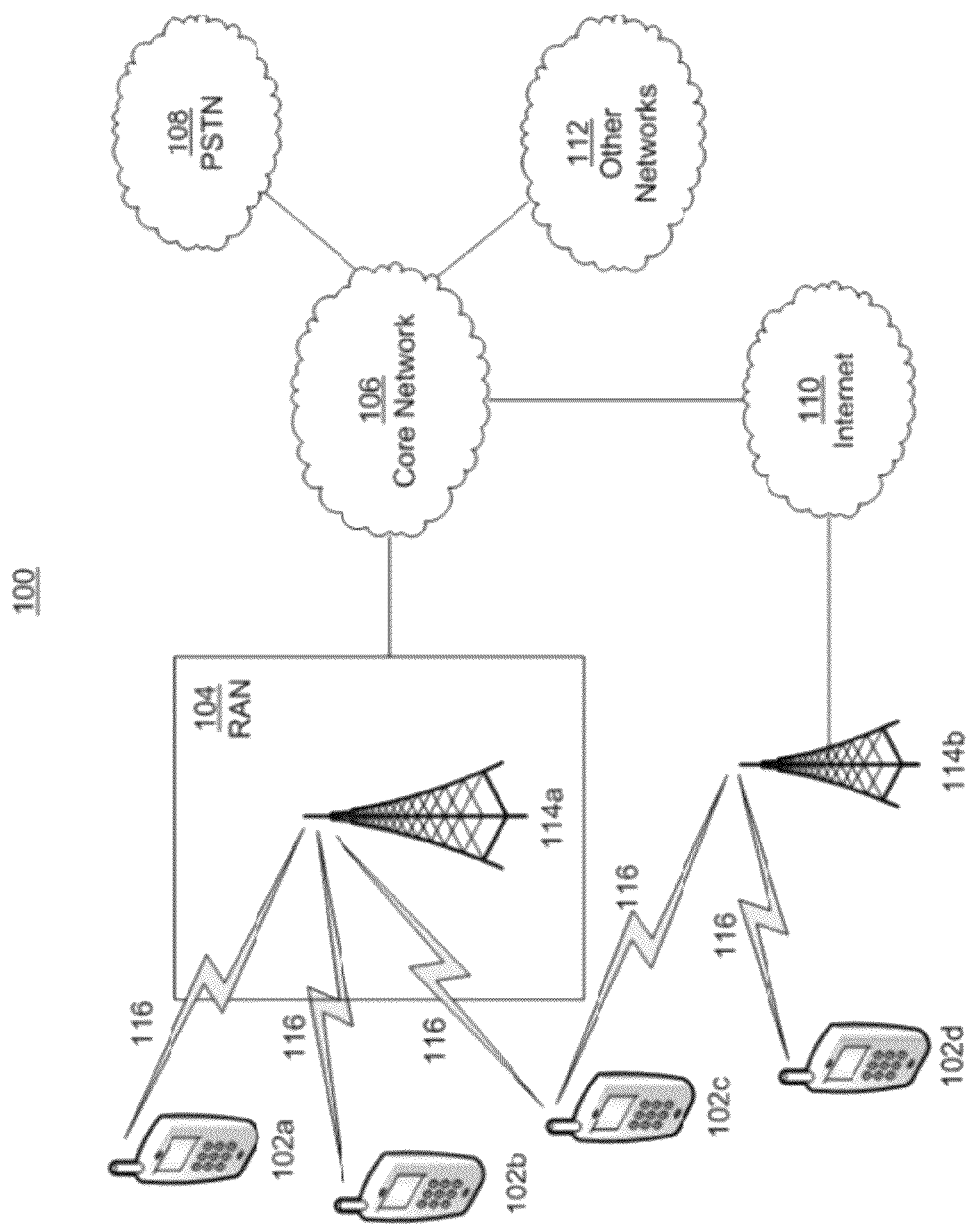
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SCFDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it may be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it may be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX>>, CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it may be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
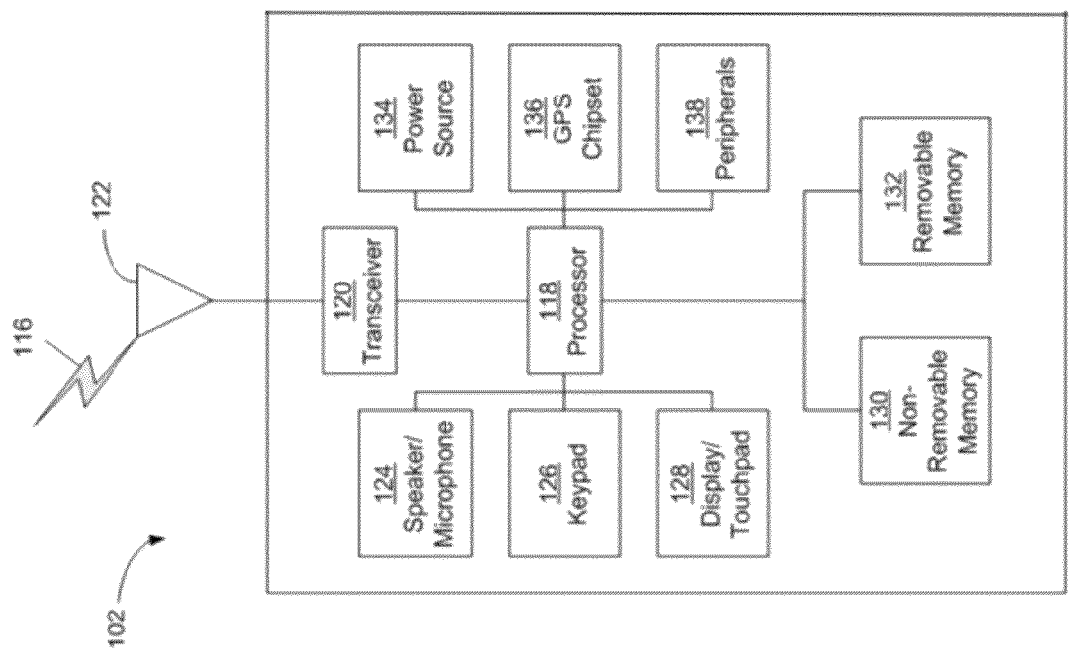
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It may be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It may be appreciated that the transmit/receive element 122 may be configured to transmit and/or receive any combination of wireless signals.

In addition, although the transmit/receive element 122 is depicted in FIG. 1E as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (81M) card, a memory stick, a secure digital (8D) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It may be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
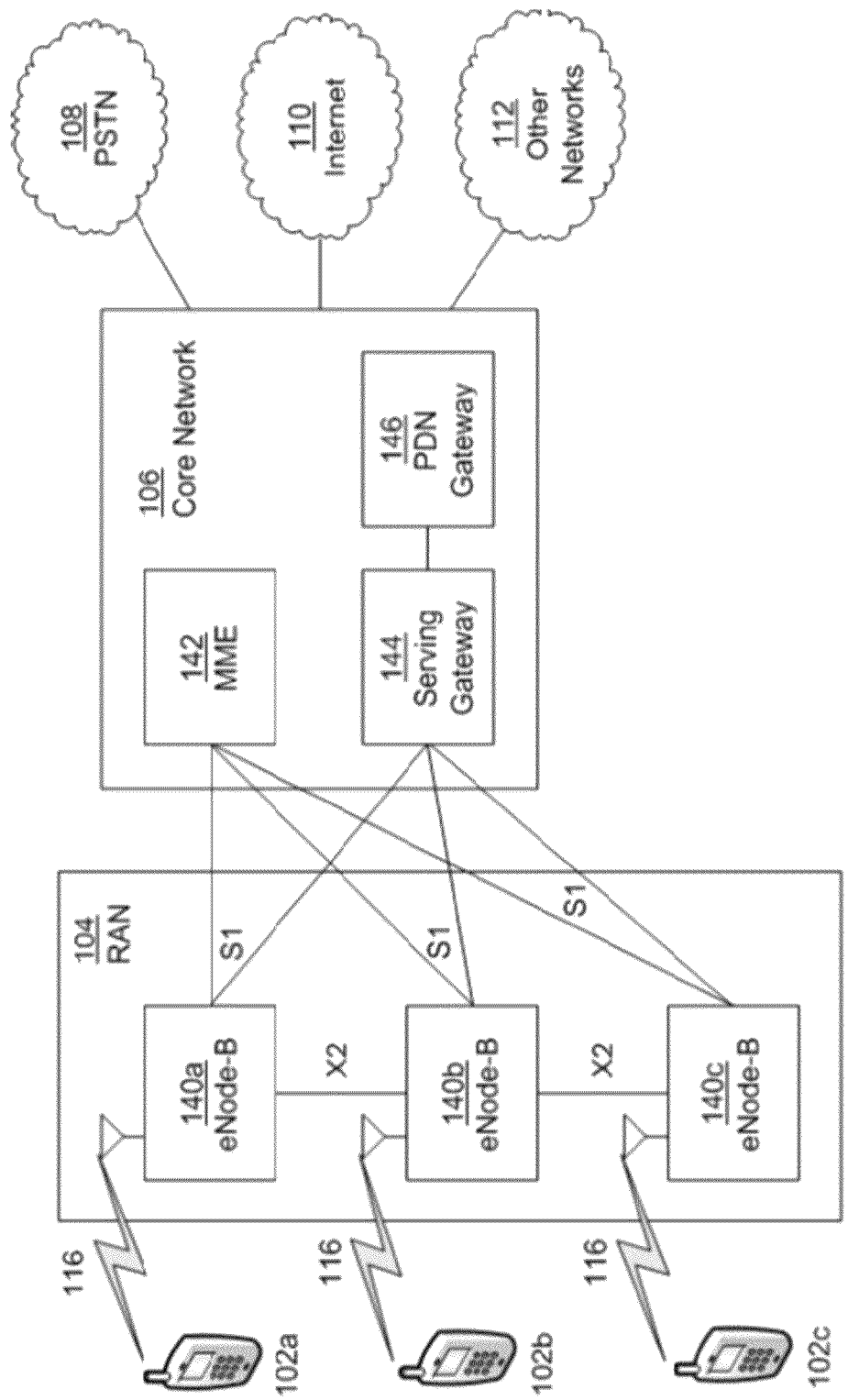
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It may be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it may be appreciated that anyone of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

Figure 2A:
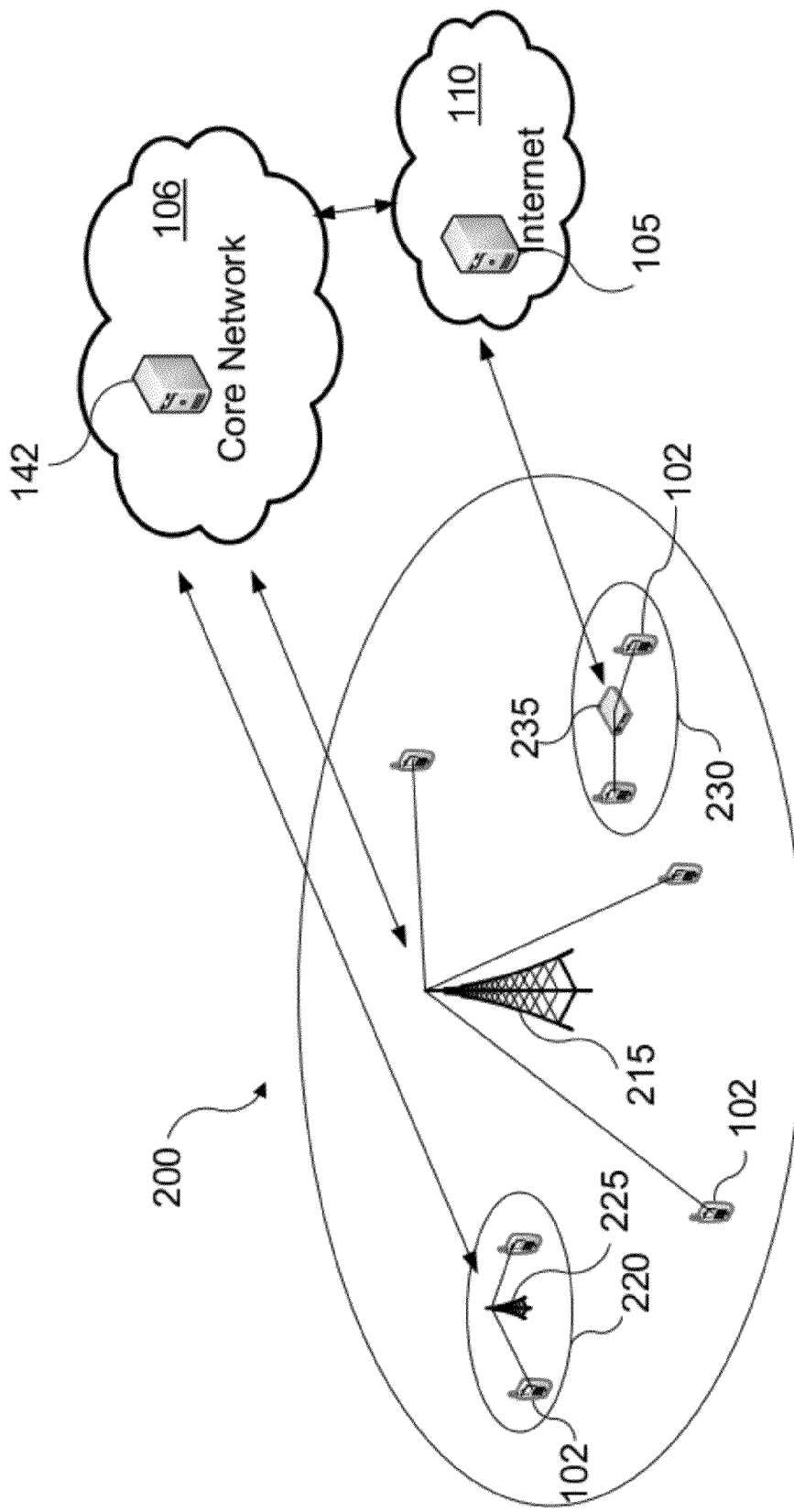
FIG. 2A is a diagram illustrating a representative system including a macro cell and a plurality of small cells with overlapping coverage areas relative to the macro cell.

The core network 106 may be connected to the networks 112, which may include other wired or wireless networks that are owned and/or operated by other service providers FIG. 2A is a diagram illustrating a representative system 200 including a macro cell 210 and a plurality of small cells 220 and 230 with overlapping coverage areas relative to the macro cell 210.

Referring to FIG. 2, the system 200 may include the core network 106, Internet 110, a plurality of WTRUs 102. The macro cell 210 may include a macro cell AP (or eNB) 215 communicating with respective WTRUs 102 in the macro cell coverage area. The plurality of small cells 210 and 220 may include one or more pico cells 220 communicating with the core network 106 using the MME 142. Each pico cells may include a pico cell AP or pico base station 225 and may communication (e.g., transmit and/or receive information) with the core network 106. Each femto cell may include a femto cell access point, femto base station, or HeNB 235. The femto AP 235 may communicate (e.g., transmit and/or receive information) with the Internet using a gateway (e.g., HeNB gateway) 105. For example, an LTE macro cell 210 and underlay of pico/femto cells 220 and 230 may be implemented. The macro cells 210 may provide service continuity. The small cells 220 and 230 may provide hot spot coverage (e.g., pico cells 220) and/or coverage for CSG members (e.g., femto cells 230).

Enhanced inter-cell interference coordination (ICIC) techniques may enhance system performance of long term evolution (LTE) systems and other communication systems deployed as heterogeneous networks 200 which may include a mix of large area (macro) cells 210 and small area cells (e.g., pico cells 220 and/or home or femto cells 230). The deployment of heterogeneous networks 200 may offer several benefits for operators, such as reduced site acquisition costs. Fully realizing the potential benefits of such deployments may be achieved (may only be achieved) by efficiently managing the interference between the different types of nodes 215, 225 and 235 that may be operating on the same frequency carrier. Several types of interference may occur during co-channel deployment. For example, for pico base stations 225 typically accessible to wireless transmit/receive units (WTRUs) (e.g., all WTRUs) 102 of the system 200 and which are deployed by the operator as a capacity enhancement, the coverage area served by the pico base station 235 for a WTRU 102 may be significantly reduced in the absence of coordination. This reduction may result from the disparity (e.g., the significant disparity) in transmission power between the (interfering) macro base station 215 and the pico base station 225. The reduction may be even more serious for a pico base station 225 located close to (e.g., within a threshold distance from) a macro base station 215. The reduction of the coverage areas of pico base stations 225 may prevent the pico base station 225 from effectively offloading traffic from the macro base stations 215 to the pico cell 220 in the absence of such coordination.

For femto base stations 235, which may not be accessible to all WTRUs 102 and may have a limited coverage area, interference (e.g., unacceptable interference may be created by the femto base stations 235 for WTRUs 1q02 served by the macro base station 215 as the WTRUs 102 pass near (or pass by) the femto base stations 235. Since femto base stations 235 may not be publicly accessible, handover to the femto cell 230 may not be possible (e.g., the operation of the femto cell 230 (e.g., femto base stations 235 and WTRUs 102 served by the femto base stations 235) may generate interference for the WTRUs 102 operating from the macro base station 215).

In certain representative embodiments, procedures may be implemented to address the type of signaling and the timing of such signaling for different network links where information related to ABS patterns may be exchanged between originating and recipient nodes and for the network nodes to the WTRUs (e.g., where such information regarding the applicable ABS pattern may be communicated). In certain representative embodiments, network nodes map exchange information pertaining to ABS patterns in the form of bitmaps, for example, at relatively moderate update rates (e.g., in the range of about zero to several hundred milliseconds). For certain settings, such as in a macro/pico architecture, communication of bitmaps to a WTRU both in terms of air interface bit rates of control channels, and update intervals may be slow. Procedures may be implemented for configuration of the WTRUs with applicable ABS patterns of the current cell and for neighbor cells in the network, which may be faster.

In certain representative embodiments, procedures may be implemented to address timing synchronization (e.g., in practical networks) to maintain transmission time alignment between network nodes to within a range of about 0 μs to 100 μs and for example less than 30 μs with respect to the beginning of corresponding subframes or frame intervals. Frame counters such as the System Frame Number (SFN) may not be aligned between network nodes even though the transmission timing of individual subframes or frames may be aligned. If a WTRU is handed over to a pico cell (e.g., 220, the WTRU 102 may not know the exact timing of the ABS of the pico cell 220 after the handover is complete. For example, the WTRU 102 may not know whether the next subframe is an actual ABS subframe or not. Because the SFN of the macro and pico cells 210 and 220 may not be (e.g., and typically are not) synchronized, a WTRU 102 may not be able to determine the start or initiation of the ABS pattern based on the macro cell 210's SFN.

In certain representative embodiments, the ABS procedures may include operations to address, for example, the unequal state of counters used for frame or sub-frame synchronization in a set of involved network nodes (e.g., macro AP 215, pico AP 225 and/or femto AP 235. The operations may use time-domain coordination techniques.

For a femto-macro cell network architecture, a WTRU 102, for example, may not be able to receive the ABS pattern (e.g., from a macro cell 210) such as during a handover and the lack of an X2 interface (e.g., that may be available for a pico AP or eNB) may cause a delay (e.g., a long delay in excess of a threshold) or effective halt the provisioning of the ABS pattern due to the inter-cell interference causes by the femto cell 230.

The system information messages may provide the WTRUs 102 with the ABS patterns and/or dedicated RRC signaling may be used to provide the ABS patterns. Because the ABS patterns may change at a given time instant coinciding with a specific WTRU procedure (e.g., when the WTRU 102 is transitioned from connected mode to idle mode or from idle mode to connected mode), a procedure for identifying specific RRC messages to carry the ABS patterns may be implemented.

"Time-domain coordination" is a technique that may mitigate interference by having nodes (e.g., potential aggressing nodes) that may refrain from transmitting some signals (e.g., particular signals) during certain subframes called "Almost Blank Subframes" (ABSs).

In certain representative embodiments, an ABS may be, for example, a subframe on which: (1) an evolved NodeB (eNB) or other cell AP 215 may transmit: (i) no signal; (ii) common reference signals (CRSs) (e.g., only CRSs); and/or (iii) the eNB or other cell AP may transmit at a sufficiently low power to ensure that a WTRU 102 operating in a small cell (e.g., pico cell) 220 does not experience interference from the eNB or other macro cell AP 215. For example, if a particular WTRU 102 is adjacent to the marco cell AP 215 and the small cell or pico cell 220 with an overlapping coverage area is farther from the macro cell AP 215, a WTRU 102 near or in the small cell or pico cell coverage area may not detect interference (e.g., any significant interference) from an transmissions from the macro cell AP 215 with sufficiently low power (e.g., below a threshold based on the location of or distance to the small cell/pico cell 220 and/or particular WTRU 102).

In certain representative embodiments, the ABS may be, for example, a subframe on which: (1) a small cell AP or femto cell AP 235 may transmit: (i) no signal; (ii) common reference signals (CRSs) (e.g., only CRSs); and/or (iii) other limited control signaling configured to not interfere with the macro cell 210 operations during the ABS.

The ABSs may be implemented in a number of ways. Radio resource control (RRC) signaling may be used to configure resource specific radio link management/radio resource management (RLM/RRM) measurement. If RRC signaling is used to configure measurement patterns for the serving cell then the WTRU 102 being served by the macro cell 210 and having potential interference from a femto cell 230 may use (e.g., only use) the indicated subframes (e.g., ABS subframes or a subset thereof associated with the femto cell 230) for measurements of the serving cell 210. For example, during the ABS subframes, the femto cell 230 may be effectively silent ensuring that proper channel or other measurements may be made (e.g., obtained) by the WTRU 102. If RRC signaling is used to configure measurement pattern for measurements on a given (e.g., or respective) neighbor cell or a given list of neighboring cells, the WTRU 102 may use (e.g., only use) the indicated subframes for measurements on the given or respective neighbor cell (e.g., regardless of any previous use or previous determination regarding multi-broadcast over a single frequency network (MBSFN) subframes in the respective neighbor cell).

In certain representative embodiments, RRC signaling may be used to configure a measurement restriction pattern for pico cell measurements, the WTRU 102 being served by the pico cell 220 and having potential interference from a macro cell 230 may use (e.g., only use) the indicated subframes (e.g., ABS subframes or subset thereof associated with the macro cell 210 or aggressor cell) for measurements of the serving cell (e.g., pico cell) 220. As another example, during the ABS subframes, the macro cell 210 may be effectively silent ensuring that proper channel or other measurements may be made (e.g., obtained) by the WTRU 102.

Although the use of indicated subframes for measurement is discussed, it is contemplated that the indicated subframe may indicate measurement restriction pattern for the WTRU 102, and that the WTRU may use this pattern to determine the subframes in which RRM or RLM specific measurements may be taken for a serving cell or neighboring cell.

In certain representative embodiments, a limited set of ABS patterns may be used based on performance requirements, for example, to establish the number of ABS patterns for the appropriate corresponding performance requirements. Constraints on the set of patterns may be signaled by the RRC. With regard to RRC signaling for channel state information (CSI) measurements, the WTRU 102 may receive a signal identifying subframes across which interference measurements may be taken and may be averaged for CSI reports.

ABS patterns may be signaled to the WTRU 102 via system information messages, or dedicated RRC signaling, or via a combination of both. In certain representative embodiments, the ABS pattern may be defined over an interval time period or interval length, for example an interval length of 40 ms (e.g., or 40 subframes), however other interval lengths both shorter and longer are possible. A 40 ms interval length may be established, as a result of matching hybrid automatic repeat request (HARQ) re-transmission occurrences that may result in re-transmission intervals that are multiples of 8 subframes with transmission occurrences of common control signals occurring in integer multiples of 10 subframes. As an example, ABS patterns may be selected or established statically or dynamically with interval lengths that are multiples of 40 subframes.

The ABS pattern or measurement patterns sent to the WTRU 102 may include a subframe offset between a first node, and a second node to allow for unimpeded occurrences of common control signals, such as physical broadcast channel (PBCR) or synchronization signals. For example, subframe #0 of the macro cell 210 may correspond to subframe #2 of the pico cell 220 in the overlapping coverage area (e.g., the macro cell frame timing may trail the pico cell frame timing by two subframes). A first bitmap may be provided by an originating network node to another recipient node to indicate which subframes are the ABS subframes. For example, the first originating node may be the macro cell AP 215, and the second recipient node may be a pico cell AP 225. The WTRUs 102 attached to either network node may be configured with another set of ABS patterns for enabling the announcement of available (e.g., always available) measurement opportunities for RLM and/or RRM in a cell. For example, the WTRUs 102 attached to the macro cell 210 may be provided with the macro cell 210's current ABS patterns. The WTRU 102 may be configured with the knowledge of or may determine an ABS pattern or patterns of a neighbor cell 220.

The WTRU 102 may be notified about the ABS pattern or patterns and triggers for applying the ABS to the WTRU 102. Certain WTRUs 102 may not use or be configured to use the ABS patterns even if the enhanced inter cell interference coordination enhanced ICIC (eICIC) may be activated. Different operating modes may be used for different types of WTRUs 102, for example, a first operating mode (e.g., for LTE Release 11 and above WTRUs) may be used for configuring the WTRU 102 to use the ABS pattern and a second operating mode (e.g., for legacy WTRUs) may be used, otherwise. The determination to use ABS procedures may depend on (1) the WTRU's position with regards to the serving cell (e.g., which may translate to the quality of the WTRU's link with its current serving cell or serving eNb or (2) another quality measurement of the WTRU's link to the serving cell (e.g., that is associated with, for example, the signal strength, bit error rate and/or other quality indicators of the WTRU's link to the serving cell, among others).

When a WTRU 102 is provided with or acquires the ABS pattern or measurement patterns, the WTRU 102 may or may not be configured to use the received ABS pattern or patterns (e.g., may not consider the pattern or patterns in its operations). In certain representative embodiments, the WTRU 102 may apply the ABS pattern or patterns based on a trigger or triggering event. For example, the WTRU 102 may wait for an event to occur before it applies the pattern or patterns. Triggers (e.g., an event or threshold condition) may be defined for the WTRU 102 to start or initiate using the ABS pattern or ABS patterns and the same or other triggers may be defined for the WTRU 102 to stop or halt using the ABS pattern or ABS patterns.

When the WTRU 102 connected to a cell (for example, the macro cell) 210 is in the vicinity of another cell 230 to which a connection (e.g., attachment) may not be allowed, such as a closed subscriber group (CSG) cell of which the WTRU 102 is not a member, the WTRU 102 may be configured to utilize the pattern (e.g., the ABS or subset of ABS) of the CSG cell or non-allowed cell 230 for enabling radio link monitoring or measurement and RRM measurements (e.g., the ABS pattern or patterns may be used for a measurement opportunity on the macro cell 210). When a WTRU 102 is leaving or has left the vicinity of the non-allowed cell 230, the WTRU 102 may stop or halt the application or use of the pattern, since the WTRU 102 may no longer be exposed to the interference from the non-allowed cell 230. The network may be informed of this condition (e.g., the movement of the WTRU 102 away from the vicinity of the non-allowed cell 230) so that the scheduling of the WTRU 102 in each subframe (e.g., all subframes) may be resumed.

Several representative embodiments are described for a scenario where the serving cell of the WTRU 102 may transmit ABS (e.g., using either a dynamic or pre-established ABS pattern). The representative embodiments may be applicable for more general situations where patterns, during which no transmission or scheduling from the serving cell, are provided to the WTRU 102. An example of such a type of pattern is an "unscheduled period" that may be used for controlling in-device interference. For example, the unscheduled period may correspond to periods in which a serving cell does not schedule the particular WTRU 102 and the unscheduled subframes may be used for transmissions/reception from the other technology in the same device.

A WTRU 102 may support carrier aggregation, (e.g., where the WTRU 102 may be configured with at least one secondary serving cell (SCell)). Any of the representative embodiments may be applied on a serving cell by serving cell basis (e.g., per configured serving cell) or for each WTRU 102 (e.g., WTRU-specific), for example, when each serving cell uses a different pattern.

An ABS pattern generally refers to a pattern or bit map associated with one or more frames that indicates which subframes are ABS. In certain representative embodiments the ABS pattern may be used by a first cell (e.g., an aggressor or interfering cell), for example, for coordination of signaling between the first network cell and a second network cell.

In certain representative embodiments, the ABS pattern or a subset of the ABS pattern may be used for coordination of measurement opportunities for the WTRU. For example, a pattern that may correspond to the ABS or a subset of the ABS pattern may be a measurement restriction for the WTRU (1) to enable proper measurement of the serving cell during intervals that the interfering cell is silent or substantially silence and/or (2) to enable signaling (e.g., coordinated signaling without inference from the interfering cell) to a WTRU 102 by the serving cell). In certain representative embodiments, the measurement opportunity may correspond to radio link monitoring and/or radio resource management measurements, such as Reference Signal Received Power (RSRP), Reference Signal Received Quality (RSRQ), or Channel State Information (CSI) measurements.

Although the measurement restrictions are described as relating to a serving cell, such restrictions may apply to a neighboring cell or multiple neighboring cells, such as list of neighboring cells.

Provisioning the WTRU 102 with the ABS pattern may be based on one or more representative procedures which may be implemented singularly (e.g., as standalone procedures) or in combination. In a first representative procedure, timing information with respect to the configuration and/or applicability of the ABS or occurrences of measurement opportunities may be exchanged between a network node 215, 225, or 235 and the WTRU 102. The timing information that is exchanged between the network node 215, 225, or 235 and the WTRU 102 may pertain to: (1) the current serving cell 230; (2) one or more neighbor cells (not shown); and/or (3) one or more small cells 220 and 230 under the coverage of another network cell 210 (e.g., having an overlapping coverage area with a macro cell 210), among others. Timing information may: (1) include a time value (e.g., an absolute timing value, such as a counter representative of successive or recurring transmission time instants in a cell); or (a relative timing value, such as a value representing a relative offset value from a known reference value (e.g., which may be representative of the difference between a first value and the known or determined reference value).

Although a SFN is described, it is contemplated that any other counter or timer value may be similarly employed in other networks to enable, for example, ABS procedures.

In certain representative embodiments, the SFN of a second cell may be communicated to the WTRU 102 by a first cell together with information pertaining to the configuration of the ABS subframes, or ABS pattern, and/or scheduled occurrences of subframes intended as measurement opportunities.

In certain representative embodiments, the observed or reported offset of the SFN of a second cell may be communicated to a WTRU 102 by a first cell as (e.g., in the form of) a difference compared to, relative to or based on a reference value. The reference value may be the SFN of the first cell.

The entire or full counter value may or may not be communicated to a WTRU 102 when either the absolute timing value or the relative timing value may be used for ABS procedures. If the SFN or other representative timing value associated with a cell is 10 bit, communicating a subset of the total number of bits may be sufficient. For example, communicating the least two significant bits may be representative of communicating a subframe offset of 1 out of 4 (e.g., one of four different subframe offsets, or SFN mod 4). A relative offset currently observed between a second cell and a first cell and communicated to a WTRU 102 may be expressed in a reduced form such as (SFN_i-SFN_j) mod N.

Multiple timing values may be communicated to a respective WTRU 102. The multiple timing values may be representative of different ABS patterns or measurement opportunity, and these may pertain to more than one cell for which timing information with respect to the configuration and/or applicability of ABS is exchanged between the network node 215, 225 or 235 and the WTRU 102.

When timing information with respect to the configuration and/or applicability of ABS is exchanged between the network node 215, 225 or 235 and the WTRU 102, the WTRU 102 may compute or determine (e.g., by lookup or otherwise) expected occurrences of ABS subframes and/or expected occurrences of subframes available for measurements in either the same cell or for a target cell based on the communicated timing information from the first cell.

In certain representative procedures, timing information with respect to the configuration and/or applicability of ABS or occurrences of measurement opportunities in a cell may be derived by a WTRU 102 based on a timing relationship. The timing information that is derived by a WTRU 102 may pertain to: (1) the same cell, such as the current serving cell; (2) one or more neighbor cells; and/or (3) one or more small cells under coverage of another network cell (e.g., a macro cell).

In certain representative embodiments, the expected occurrences of ABS subframes or ABS patterns, or the occurrences of subframes made available for measurements may be defined (e.g., deliberately defined) to commence at pre-determined time instances when compared to a downlink (DL) signal observed or detected by the WTRU 102 in either the same or a target cell. For example, when ABS patterns or occurrences of subframes offering measurement opportunities are configured to recur or repeat every N=4 frames (e.g., every 40 subframes), the first frame of the recurrence pattern may coincide with frames where SFN mod 4=0.

One or more fixed counters, timers, and/or offset values may be used to track the timing synchronization between or among cells. For example, specific instances of the recurrence pattern may be chosen to coincide with planned subframe or frame occurrences of the PBCR, SIB1, or synchronization signals to provide reference timing.

When information with respect to the configuration and/or applicability of ABS is available in the WTRU 102, the WTRU 102 may compute or determine the expected occurrences of the ABS subframes and/or the expected occurrences of subframes available for measurements in either the same or for a target cell based on a known occurrence of frame or subframe or transmission instance of the selected down link (DL) signal to obtain the map of a scheduled recurrence pattern for ABS and/or measurement opportunities.

In certain representative procedure, the recurrence patterns to provide measurement opportunities to the WTRUs 102 when using ABS may be configured to allow for guaranteed occurrences of observable measurement opportunities across a number of cells. For example, multiple interfering cells 230 may be coordinated using the same time domain techniques (e.g., by using common ABS associated with each of the multiple interfering cells 230) to ensure relative silent during the common ABS intervals (or non-interference intervals) for measurement opportunities and/or serving cell 210 communication with the WTRU 102.

In certain representative embodiments, subframes or frames configured to provide measurement opportunities to WTRUs 102 in a first cell (e.g., cell 210) may be scheduled to occur at different recurrence intervals when compared to recurrence intervals of a second cell (e.g., cell 230). For example, the first cell 210 may make available one or more measurement subframes in certain frames (e.g., frame instances) N, N+6, N+12, N+18 . . . , whereas the second cell 230 may be scheduled to provide measurement opportunities in one or more subframes of other frames (e.g., frame instances) N, N+7, N+14, N+21 . . . (e.g., where N is an integer number). Even in the case of aligned (e.g., perfectly aligned) transmission time instances between the first cell 210 and second cell 230 in subframe of frame #N, a WTRU 102 may be guaranteed to dispose of a measurement opportunity in regularly occurring time intervals given the different intervals for those measurement opportunities between the first cell 210 and the second cell.

In certain representative embodiments, the number of subframes or frames providing measurement opportunities to a WTRU 102 may be configured to be the same between the first cell 210 and the second cell 230 when observed over a given time period. For example, the first cell 210 may make available M measurement subframe in frames N, N+8, N=16, N+24 . . . , whereas the second cell 230 may make these M measurement subframe available in frames N+2, N+10, N+18, N+26 . . . (e.g., where M and N are integer numbers). When transmission time instances of subframes (and/or frames) are maintained coarsely synchronized within a set of network nodes, different time-domain recurrence patterns may be configured for these network nodes. When information with respect to the configuration and/or applicability of measurement opportunities using ABS is available in the WTRU 102, the WTRU 102 may compute or determined expected occurrences of measurement subframes either in the same cell or for a target cell by taking into account, as applicable, either unavailable subframes or the different recurrence intervals and/or schedules.

In certain representative procedures, information with respect to the configuration and/or applicability of the ABS or occurrences of measurement opportunities may be exchanged between a network node 215, 225 or 235 and the WTRU 102 and the WTRU 102 may be preconfigured with a default ABS pattern and/or a pattern of scheduled occurrences for measurement opportunities when using ABS. The pre-configuration of the default ABS in the WTRU 102 may occur either through storage in memory of a given ABS or measurement opportunity pattern in the WTRU 102, or the pre-configuration may occur by configuring one or more of these patterns through a first signaling message issued by a network resource (e.g., a network node and/or other network entity, among others). A signaling mechanism or procedure using a second signaling message may be used between the network resource and the WTRU 102 to switch one or more of the preconfigured ABS pattern or patterns (e.g., or scheduled occurrences of measurement opportunities) on or off or to switch between or among a preconfigured ABS pattern or preconfigured ABS patterns. The switching of the one or more ABS patterns may occur as a result of a determination that the ABS pattern may not or may no longer be applicable. For example, a single bit flag, or a short identifier may be used by the network or system 200 through the signaling message sent to one or more WTRUs 102 to announce or enable the use of either one particular or several ABS or measurement opportunity patterns. For example, the WTRU 102 may be updated with respect to the applicability or a change in the status of the ABS or measurement opportunity patterns via dedicated or broadcast messages. When information with respect to the configuration of the ABS, or measurement opportunities using ABS, is available in the WTRU 102, the WTRU 102 may execute an update to its reception and/or measurement schedule either for the same or for a target cell, upon reception of a signaling message received from the appropriate network resource or node.

In certain representative embodiments, the amount of signaling resources used to communicate occurrence of the ABS or measurement opportunity subframe or frames may be reduced by using an identifier value. For example, when multiple ABS patterns, or when multiple patterns providing measurement opportunity are allowed or configured for use in a cell (e.g., a macro cell 210), each of these patterns may correspond to one distinct and/or unique identifier that may be used between or among the WTRU 102 and one or more network resources for communicating the identity of the selected pattern or patterns under consideration. As an example, when four distinct patterns providing occurrences of ABS or measurement opportunities are possible for use, instead of communicating the entire bitmap (e.g., communicating N=40 bit long bitmaps from a network node to the WTRU, for example, when the ABS pattern is 4 frames long), only two bits may be communicated using a short identifier (e.g., a unique identifier) for each available pattern. When the number of distinct ABS patterns increases, the number of short identifiers may also increase but at a slower rate. When the short identifier becomes available to the WTRU 102 from a received signaling message sent by a network resource, the WTRU 102 may compute or determine (for example, by a lookup procedure from a table in memory) the occurrences (e.g., expected occurrences) of ABS subframes and/or the occurrences (e.g., expected occurrences) of subframes available for measurements in either the same cell or for a target cell, based on the communicated identifier.

In certain representative embodiments, the identifier pertaining to the configuration or applicability of the ABS and/or the ABS or measurement opportunity pattern may encode the specific pattern and/or a reference timing value. The reference timing value may address a specific subframe instant where the pattern is scheduled to commence or may be planned to start. For example, when four distinct ABS patterns are in use, nominally four identifiers (or 2 bits) may be used. A size of the identifier field may be increased by another 4 bits (e.g., to a total of 6 bits) such that the short identifier and a starting subframe may be indicated. For example, the initial subframe identifier (e.g., that identifies one of the subframes #1, #2, #3, #4, #6, #7, #8, #9, as the starting subframe) may be communicated to the WTRU 102 based on the 4 additional bits in the 6 bit identifier field (e.g., subframes #0 and #5 may be excluded as containing control signals).

Although a 6 bit identifier field related to the composite of the short identifier and the initial subframe identifier is described, it is contemplated that the identifier field may be any length as long as it has a sufficient number of bits to uniquely identify a preset number of ABS patterns and the starting subframe.

In certain representative embodiments, a reoccurrence value may be identified along with a starting subframe to identify the timing of the ABSs.

In certain representative embodiments, the reoccurrence value may be changed dynamically by the network (e.g., a cell) to increase or to decrease the number of guaranteed ABS occurrences or measurement opportunities.

In certain representative embodiments, the WTRU 102 may be provided with the full ABS pattern (e.g., entire ABS pattern or subframes in which data may be transmitted) of a cell (e.g., for scheduling of measurement restrictions). In other representative embodiments, the ABS pattern may be a subset of the full ABS pattern (or subframes in which data may be transmitted), sometimes referred to herein as one or more measurement patterns.

The pattern may be defined relative to: (1) the master information block (MIB), (2) one of the System Information Blocks 1-16 (SIB1-16) (e.g., SIB1), and/or (3) a specific redundancy version or a retransmission thereof, of either the source cell (or the target cell in the case of handover). The measurement pattern may be determined or defined relative to the SFN and/or subframe number of the source or the target cell. The measurement pattern to use may be determined based on the physical cell identity of the source or target cell. For example, the WTRU 102 may get or obtain the pattern when the WTRU 102 knows or determines the physical cell identity of the respective cell.

The pattern may be provided via medium access control (MAC) packet data units (PDUs) in a MAC control PDU, for instance. The MAC layer in the WTRU 102, upon reception of a MAC PDU including information relating to the pattern, may forward the information to the upper layers (e.g. the RRC located in layer 3).

In certain representative embodiments, the ABS of a frame may: (1) start at a pre-established subframe number; (2) be dynamically indicated by the cell for each frame or for a pre-establish number of frames, (3) be updated periodically; and/or (4) be updated by one or more triggers (e.g., triggering events and/or conditions).

In certain representative embodiments, the ABS of a frame may start at a subframe number in a first frame and may rotate through other subframes in subsequent frames based on a pre-established sequence or pattern and/or algorithm.

Triggers may be used to signal and/or apply the ABS patterns to WTRUs 102. The WTRU 102 may be provided with ABS patterns. Each of the following examples may be used alone or in any combination. At transitions (e.g., each transition) from idle to connected mode, the network may provide the WTRU 102 with an ABS pattern. The WTRU 102 may be configured with a default ABS pattern or the WTRU 102 may determine a default ABS pattern based on specific cell parameters (e.g., the cell identity). The WTRU 102 may apply the default pattern: (1) for a predetermined time or number of subframes or frames; (2) until an explicit indication to use a new pattern is signaled; and/or (3) until a new pattern is determined based on some offset relative to the current pattern. For example, the WTRU 102 may be informed to use a new pattern that is derived by shifting the current ABS pattern by N subframes, where N is an integer that may be signaled to the WTRU 102.

In certain representative embodiments, at handover of the WTRU 102 from one cell (e.g., pico cell 220) to another cell (e.g., macro cell 210), the network or system 200 may indicate (or provision) an ABS pattern and whether or not for each provisioned ABS pattern the WTRU 102 may apply the indicated ABS pattern. The indication of whether to apply the provisioned ABS pattern may be included in the handover even if the WTRU 102 is not to apply the pattern directly (e.g., based on the use of a triggering event or triggering condition for such application). For example, the WTRU 102 may be provided with the ABS pattern as part of handover and the WTRU 102 may be informed not to apply the ABS pattern until a different or specific indication is received by the WTRU 102. In certain representative embodiments, the WTRU 102 may be preconfigured to apply the pattern after one or more actions (e.g., defined actions) are completed (e.g., after sending the RRC Connection Reconfiguration Complete, and/or after N subframes following the handover, where, for example, N is an integer that is either preconfigured or signaled to the WTRU 102. The WTRU 102 may be provided with the ABS patterns when the WTRU 102 takes specific actions.

When the WTRU 102 sends a proximity indication to indicate that the WTRU 102 may be close to a closed subscriber group (CSG) cell, for example, in a macro cell 210 femto cell 230 deployment), the network 200 may be triggered to provide the WTRU 102 with ABS patterns that the WTRU 102 may apply upon reception, or upon the occurrence of one or more other events. The proximity indication may include an indication that the WTRU 102 is already applying an ABS pattern that the WTRU 102 may signal to the network 200. The WTRU 102 may send a proximity indication (e.g., indicating that the WTRU 102 may be "leaving a CSG proximity") to inform the network 200 that the ABS patterns may no longer be applied by the WTRU 102. The WTRU 102 may store the ABS pattern of certain cells, such as macro cells 210, CSG pico cells 220, and/or cells/femto cells 230, among others. The WTRU 102 may have an ABS pattern for the CSG IDs (e.g., every CSG ID) that it may include in its white list. The WTRU 102 may request an ABS pattern (or may apply a stored ABS pattern, if it already has such information stored) upon receipt of a lower layer indication of at least one out of sync event. The number and/or the type of triggering events that may trigger the application of ABS or trigger the request for an ABS pattern may be preconfigured or dynamically signaled to the WTRU 102.

In certain representative embodiments, triggers that cause the application of ABS patterns in the WTRU 102 may be used in any combination. The WTRU 102 may apply the ABS patterns as soon as (e.g., immediately after) it receives the patterns (e.g., either for the first time, or a change to the current pattern is detected) in connected and/or idle mode WTRUs 102.

In certain representative embodiments, the WTRU 102 may apply the trigger in a certain mode of operation based on (e.g., as per) a default configuration or based on (e.g., as per) an indication from the network 200. For example, the network 200 may indicate if a WTRU 102 may apply the trigger or triggers: (1) in connected mode (e.g., only in connected mode and not in idle mode); (2) in idle mode (e.g., only in idle mode and not in connected mode) or in both idle and connected modes. In certain representative embodiments, the WTRU 102 may apply the ABS pattern or patterns at transition to connected mode (e.g., certain transitions or every transition to connected mode).

The WTRU 102 may apply the ABS patterns when the eICIC is activated, which may be indicated in the system information (e.g. by use of 1-bit position) or which may be signaled to the WTRU 102 via dedicated RRC messages. The WTRU 102 may be informed to start applying the ABS pattern or patterns using the MAC PDUs. The WTRU 102 may inform the network 200 that the ABS patterns are applied in the WTRU 102 (or deactivated in the WTRU) using the MAC PDUs.

The MAC layer in the WTRU 102/network 200 may provide an indication of the ABS patterns and/or whether to apply the ABS pattern to upper layers, such as the RRC, for example. The same or a similar procedure may be used to stop applying the measurement patterns (or deactivate eICIC). For example, the WTRU 102 may be informed not to apply the ABS patterns in handover messages (or any mobility message, e.g., RRC Connection Release that may include redirection information), even if the WTRU 102 applies the patterns in the source cell and/or even if the WTRU 102 is provided with a new ABS pattern or patterns.

In certain representative embodiments, sending and/or receiving information from the network may include sending and/or receiving information from the serving cell or serving cell AP.

The WTRU 102 may apply the ABS pattern or patterns when (e.g., whenever) it knows or determines that it is in the proximity of one or more CSG cells (e.g., femto cell 230) or other cells (e.g., pico cell 220) for which it had previously applied ABS patterns. The WTRU 102 may apply the ABS pattern or patterns with or without notifying the network 200. The proximity to another cell (e.g., other than the serving cell of the WTRU 102 may be a trigger for the WTRU 102 to request the current ABS pattern or patterns. The WTRU 102 may apply or request the ABS pattern or patterns responsive to certain modes of operation being configured for particular layers of the WTRU 102. For example, the WTRU 102 may configures lower layers to operate in acknowledged mode and may apply (e.g., always apply) the ABS pattern or patterns to ensure that its link with the serving cell or candidate target cell provides the minimum quality of service (QoS). The WTRU 102 may be informed to start applying the ABS patterns using, for example, L1 signaling, although other types of signaling are possible. For instance, the L1 signaling may correspond to a PDCCH order. The triggers that cause the WTRU 102 to apply the ABS patterns may also be used as triggers to request the ABS patterns, and vice versa (e.g., the triggers that are used to request the ABS patterns may also be used to cause the WTRU 102 to apply the ABS patterns).

A number of different representative embodiments exist for ABS pattern or measurement pattern acquisition procedures. In certain representative embodiments, the WTRU 102 may acquire the ABS pattern of a neighboring cell and may report it to the serving cell (e.g., macro cell 210). The acquisition procedures may be applicable to both LTE and HSPA and, for example, may be used to assist the serving cell (e.g., either macro cell 210 or serving pico cell 220) to provide the ABS pattern of the candidate target cell (either pico cell 220 or macro cell 210 or femto cell, respectively). The acquisition procedures may reduce: (1) communication between the cells 210 and 220, (2) the performance of SFN synchronization via network interfaces; or (3) may allow pattern acquisition in the case where no X2 interface exists (e.g., (i) between the macro cell 210 and femto cell 230, (ii) between the macro cell 210 and the pico cell 220, (iii) between the pico cell 220 and the femto cell 230 and/or (iv) among the macro cell 210, the pico cell 220 and the femto cell 230.

The ABS pattern for the femto cell 230 (or a neighboring cell 220) may be broadcasted over (or in) the system information block (SIB). The information may be broadcasted in SIB1 or on any other SIB. The ABS information, referred to hereafter as 'ABS info' may include one or a combination of the examples described below.

In certain representative embodiments, the explicit ABS pattern or an index to a set of predefined patterns may be sent to the WTRU 102. The ABS pattern may correspond to: (1) ABS pattern Set 1 (i.e., that indicates a set of sub-frame that a particular cell may not be transmitting on); and/or (2) ABS pattern Set 2, referred to hereafter as a measurement pattern (i.e., the patterns that the WTRU 102 is provided with for measurements for example for Radio Link Monitoring (RLM) or RRM or CSI, which may be a subset of ABS set 1). One or both of the ABS pattern 1 or ABS pattern 2 may be broadcasted over the SIB.

A time reference of the ABS pattern with respect to the femto cell 230, pico cell or neighboring cell 210 may correspond to any of the time references described in this disclosure and may include, for example, the SFN of the femto cell 230 (or neighboring/target cell 210) and/or the subframe number (e.g., with respect to: (i) the scheduling of SI1 or the MIB; (ii) an index from 0 to (X−1) which may indicate the SFN frames in which the patterns may start, where X may correspond to the duration of the ABS pattern in terms of frames. For example, for an ABS pattern of 40 ms or 4 frames, X may correspond to 4. The WTRU 102 may determine the SFN in which the pattern is to begin, as the SFN for which the following condition is met: SFN mod X=broadcasted index; and, an additional offset in terms of sub-frames may be provided in addition to the SFN information. The pattern may be repeated at indicated (e.g., every indicated) SFN+offset time.

The WTRU 102 may be allowed to (e.g., and/or configured to) acquire the pattern of the candidate target cell while in connected mode and/or in idle mode from the system information and may be performed as part of: (1) the CSG system information acquisition procedures; (2) the automatic neighboring relation (ANR) procedures; (3) and/or a new ABS pattern acquisition procedure.

The WTRU 102 may determine the acquired ABS info and signal back to the network one or all the acquired ABS patterns and/or the offset between the timing of the serving macro cell 210 and the timing of femto (CSG) cell 230 (e.g., more generally between the serving cell 210 and the target cell 230). The information may be referred to hereafter as "serving cell timing offset" and may correspond to one of:

(1) the SFN difference between the two cells (e.g., macro cell 210 and femto cell 230 with reference to the serving cell 210;
(2) the SFN difference and the sub-frame offset;
(3) a calculation, by the WTRU, of the corresponding SFN and/or the subframe on the macro cell 210 in which the pattern may begin and may signal the absolute value;
(4) a calculation, by the WTRU, of the corresponding SFN index for the serving macro cell 210, which may be sent to the network 200;
(For example, the SFN index (e.g., a new index) may correspond to the SFN index difference plus femto broadcast index, where SFN index difference may be calculated by Equation 1 as follows:

$$\text{SFN index difference} = |(\text{current SFNmacro mod } X) - (\text{current SFNfemto mod } X)| \quad (1)$$

This corresponds to the amount by which the frame boundaries are different from each other.
(5) the SFN index difference, if the timing reference of the of the femto cell 230 in the ABS info is provided in terms of a SFN index;
(6) a calculation or determination of the offset between the scheduling of MIB or SIB of the serving cell 210 and the target cell 230. For example, the offset may be provided in terms of units of: (1) subframes; or (2) frames and/or subframes).

The timing offset may correspond to any of the units and/or methods described above:

To determine and/or calculate the offset, the WTRU 102 may acquire the SFN number of the target cell 230 or of the non-CSG cell 220, or may determine the timing of the MIB or SIB transmissions of the target cell. Once the information is acquired, the WTRU 102 may use the information it has on the macro cell 210 to determine the difference and the offset.

The following representative procedures for acquiring and reporting the ABS pattern may include the WTRU 102 determining whether to report the ABS info and/or the serving cell timing offset to the WTRU 102. For example, when the WTRU 102 enters the coverage of the femto cell 230, the network 200 may indicate (e.g., explicitly indicate) to the WTRU 102 to read the system information of the CSG cell or of a neighboring cell 230, using, for example, the cause "report CGI" in the measurement object. This information may be used by the WTRU 102 to acquire the CSG ID of the target cell 230 and to determine whether it is a member or not. When the WTRU 102 determines that it is not a member of the CSG cell 230, it may proceed to try to acquire the ABS info from the system information. When the WTRU 102 acquires the CSG ID, it may also acquire and may store the ABS info of the target cell 230 regardless of whether it is a member or not. When acquiring the ABS info, the WTRU 102 may determine and may calculate the serving cell timing offset. The serving cell timing offset may be calculated, in response to the WTRU 102 determining whether the information is or is not to be reported to the network 200. The WTRU 102 may then report the acquired information to the network 200. The WTRU 102 may determine whether the information is reported based on one or a combination of the following criteria: if the CSG identity is included in a whitelist and the CSG-member status is set to 'member', the WTRU 102 may not report the ABS info; otherwise, if the criteria is not met (e.g., the CSG identity is not in the WTRU's white list) the WTRU 102 may report the ABS info and the serving cell timing offset. The WTRU 102 may include the CSG-identity, the member status, and/or the ABS info, if appropriate (e.g., present), regardless of the member status of the WTRU.

In certain representative embodiments, the WTRU 102 may be signaled (e.g., explicitly signaled) and may be configured to acquire and to report the 'ABS info'. The information may be provided to the WTRU 102 by one or a combination of the following: (1) a new indication may be added to the measurement configuration message; (2) a new indication in the RRC reconfiguration message; and/or (3) a new purpose within the reportConfig may be added. For example, reportABSinfo, which is a new indication associated with 'reportCGI', may be added in a new RRC message used to request WTRU 102 to acquire the ABS info for a cell.

In addition to the explicit request, the network 200 may also indicate one or more Physical Cell Identifier (PCI) or Primary Scrambling Code (PSC) of the cells for which it is requesting the acquisition of the ABS pattern. In certain representative embodiments, the explicit request may be provided as part of the 'cellForWhichToReportCGI' or 'cellForWhichToReportABS'. When the WTRU 102 receives the indication, it may attempt (e.g., try) to acquire the system information containing the ABS info and may determine the serving cell timing offset. The information may then be reported back to the network 200 in a measurement report.

In certain representative embodiments, additional explicit indications are not provided to the WTRU 102 by the network 200. For example, if the WTRU 102 determines that the measurement purpose is for a reportCGI in addition to attempting or trying to acquire or may acquire: (1) the CSG-identity, e.g., if present; and/or (2) the Cell Global Identifier (CGI), PLMN (e.g., if requested), the WTRU 102 may attempt to acquire the ABS info, if the ABS info is broadcast in the concerned cell. The WTRU 102 may also determine the serving cell timing offset, and trigger a measurement report. In the measurement report, the WTRU 102 may report back the acquired ABS info and serving cell timing offset. In one representative procedure, the ABS info and the determined serving cell timing offset may be included in the measurement report, if the measurement purpose is set to reportCG and the cell broadcasts the ABS info.

The WTRU 102 may acquire the ABS info and timing offset information using any of the procedures described above. In certain representative embodiments, the WTRU 102 may not report the ABS info and timing offset information to the network 200, while in other representative embodiments this information and/or additional information may be reported to the network 200. In one representative procedure, a one-bit indication may be provided by the WTRU 102 to the network that an ABS pattern has been obtained for the target cell. In a second representative procedure, the WTRU 102 may perform actions after a determination of the ABS pattern. For example, in response to or based on the determination of the ABS info and the timing offset, the WTRU 102 may report the pattern to the network 200 and may autonomously start using at least one of the pattern for measurement purposes (e.g., use at least one of patterns provided as part of ABS set 2). In a third representative procedure, the WTRU 102 may be prevented from starting to use one or more of the acquired measurement patterns (e.g., ABS set 2) until a confirmation (e.g., explicit confirmation) is sent by the network 200. The network may configure (e.g., explicitly configure) the WTRU 102 to take measurements during the ABS periods. The network 200 may provide, for example, a one-bit information element (IE) that when received (e.g., present in a received signal or message), the WTRU 102 may start using the ABS info of the acquired target cell for measurement purposes. The WTRU 102 may determine on its own (e.g., by itself without intervention) the time in which (or by which) the pattern may start according to the information and timing offsets it has acquired.

In certain representative embodiments, the network may provide (e.g., may explicitly provide) the ABS pattern to (e.g., back to) the WTRU 102 or an index to a predefined set of patterns. The WTRU 102 may receive the ABS pattern (or index) and new reference timing with respect to the macro cell 210. The ABS pattern or index may be the same pattern or corresponding index reported by the network 200, or may be one or more new measurement pattern or a different index (e.g., new index) that may be generated by the network 200. The network 200 may also provide a set of different patterns for different measurement purposes. As a first example, if the neighboring cell is providing ABS set 1, then the WTRU 102 may acquire the ABS info and serving cell timing offset information and may report it to the network 200. The ABS info and timing offset information may be used by the network 200 to determine the ABS pattern that the femto cell or neighboring cell (e.g., small cell 230) is using for its operations. The eNB 215 of the macro cell 210 may then determine what measurement patterns to configure the WTRU with and indicate (e.g., explicitly indicate) to the WTRU 102 the measurement patterns it is to use for measurement purposes.

As a second example, if the neighboring cell is providing measurement patterns (e.g., only ABS set 2), the WTRU 102 may acquire it, and start using the measurement patterns provided for measurement purposes according to any of the embodiment described above, and/or may send it to the network for information purposes, or wait for an explicit indication to start using the measurement patterns.

In a third example, if the neighboring cell is providing ABS set 1 and ABS set 2, the WTRU 102 may report back both sets, or may report back one (e.g., only one) of the sets for information purposes and may autonomously start using ABS set 2 for measurement purposes. In certain representative embodiments, the WTRU 102 may wait to receive both before beginning to use any ABS set (e.g., ABS set 1 or ABS set 2).

In addition to the ABS info and timing offset, the WTRU 102 may also report the measurement quality of the femto cell, pico cell, or neighboring cell (e.g., cell 230). Similar to the second example, the WTRU 102 may wait for an explicit indication/configuration by the serving cell (e.g., macro 210).

The patterns provided to the WTRU 102 may be used for different measurements. For the macro-femto scenario, the WTRU 102 may use the received patterns for RLM purposes for example, but not for measurement of the Reference Signal Receive Quality (RSRQ) or Reference Signal Received Power (RSRP) and (e.g., not for intra-frequency measurements). The measurement patterns provided may be for serving cell measurements purposes, for neighboring cell measurement purposes, for RRM (e.g. RSRQ and RSRP) and RLM on the serving cell, and/or CSI (e.g., if the WTRU is in connected mode).

The patterns may be used for the serving cell 210 only, if the network 200 provides the configuration to the WTRU. For example, if the WTRU 102 is provided with an ABS configuration, then the WTRU 102 may use the ABS configuration for measurements on the current serving cell only and may not use it for neighboring cells (e.g., measurement restrictions may not be applied for neighboring cell). It is contemplated that this procedure may be applied to other scenarios where the pattern may be provided to the WTRU 102 via RRC messages.

It is contemplated that procedures described herein may be applicable to measurements performed in: (1) the same frequency, (2) different frequencies, and/or using different RATs. For example, the request to measure and report the patterns may be directed towards a different frequency and/or RAT.

Operation of the WTRU 102 in idle mode is described below. A WTRU 102 performing cell reselection in idle mode may acquire the ABS info of its target cell and store the information (e.g., for later use) and/or may determine to start using the pattern for measurement restrictions and/or for paging and SIB/MIB reception. The ABS patterns, ABS info and timing offsets may be used by (e.g., implicitly used by) the WTRU 102 to determine the time or times in which to perform measurements. The WTRU may determine to start using a pattern for measurement purposes, for paging and/or for MIB/SIB reception if one or a combination of the following criteria is met: (1) the ABS info is present in the SIBs or the WTRU has valid ABS info stored for this cell; (2) the WTRU 102 is capable of performing eICIC procedures; (3) the network has signaled that it is capable and/or performing eICIC procedures (e.g., (i) by a capability bit broadcasted by the network; (ii) by implicit procedures (e.g. the ABS info is broadcasted); and/or (iii) by direct configuration via RRC message, among others); and/or (4) the UE determines that it is being interfered by a neighboring aggressor cell.

In certain representative embodiments, the WTRU 102 may establish the determination that it is being interfered by a neighboring aggressor cell by the WTRU 102 determining that the best-ranked cell is a CSG cell and the WTRU is not a member of the CSG cell. For example, the WTRU 102 may establish that it is being interfered by a neighboring aggressor cell by determining that: (1) according to cell reselection criteria, the neighboring cell is a best ranked neighboring cell and it meets the criteria to perform cell reselection to that cell (2) the best ranked cell is a CSG cell; and (3) the WTRU 102 is not a member of the CSG cell.

In certain representative embodiments, the reselection ranking criteria may be established as described in 3rd Generation Partnership Project (3GPP) standards document TS 36.304 V10.3.0, entitled "Technical Specification Group Radio Access Network; Evolved Universal Terrestrial Radio Access (E-UTRA); User Equipment (UE) procedures in idle mode," the contents of which are incorporated by reference herein.

In certain representative embodiments, the WTRU 102 may determine that it is being interfered by a neighboring aggressor cell 230, if the Physical Cell Identifier (PCI) of the best ranked cell on the respective frequency is in the CSG PCI range (e.g., indicating that the cell is a CSG cell) and the WTRU 102 does not have a CSG ID in its white list (e.g., the neighboring cell is the CSG cell and the WTRU is not a member of the CSG cell).

In certain representative embodiments, the WTRU 102 may establish a determination that it is being interfered by a neighboring aggressor cell when: (1) the quality of the neighboring cell or target cell: (i) exceeds a threshold (e.g., is above the threshold); (ii) exceeds the quality of the serving cell (e.g., a macro cell) or (iii) exceeds the quality of the serving cell by at least a threshold amount (e.g., positive or negative); (2) the quality (received power and/or ranking) between the serving cell and the candidate or target cell is above a certain threshold (e.g., the absolute received channel quality (e.g., RSRP or RSRQ) of a neighboring is above the quality of a serving cell by a certain threshold); (3) the WTRU 102 cannot reselect to the better serving cell because (i) due to cell specific offset, the cell reselection criteria is not met (e.g. even if the quality of a neighboring macro cell may be better than the serving pico cell, the cell reselection criteria may not be met due to cell specific bias); and/or (ii) the WTRU 102 is not allowed to reselect due to a non-allowed CSG or access restrictions. It is contemplated that representative embodiments described herein are applicable to WTRUs that may use an autonomous search function or location based trigger to indicate or detect that an interfering aggressor cell are present in the vicinity. These thresholds may be broadcast over the macro cell or the pico cell.

When the criteria or criterion set forth above is no longer met, the WTRU 102 may determine that it is no longer being interfered with by the aggressor cell.

In certain representative embodiments, upon or after determining that the WTRU 102 is being interfered with by a neighboring aggressor cell, the WTRU 102 may acquire (if not already acquired) the ABS info and any other neighboring cell info from the system information. If ABS info is available and broadcasted, the WTRU may start using the ABS pattern for measurement purposes and/or for paging or MIB/SIB acquisition. The ABS pattern, as previously discussed, may be acquired from the neighboring aggressor cell or from the serving cell (e.g., for example macro cell 210. In the latter scenario, the serving cell 210 may broadcast a common pattern for femto cells (e.g., all femto cells) 230 or a pattern and applicable PCIs may be broadcasted.

In certain representative embodiments, a predefined pattern may be used for interfered WTRUs 102 that are in idle mode.

In certain representative embodiments, when the WTRU 102 determines that is being interfered with by an aggressor cell according to any of the criteria described above, it may acquire and store the ABS info of the aggressor cell. The WTRU 102 may continue normal operation and may not immediately begin using the ABS pattern or patterns, until a RRC Connection Request is initiated at the WTRU 102. If one or a combination of the above criteria is met and the WTRU 102 is requesting to establish a connection, the WTRU 102 may notify the network 200 of the interference situation with the neighboring aggressor cell. The WTRU 102 may report one or a combination of the following parameters to the network 200: (1) the ABS info; (2) the timing offset; (3) the PCI of the interfering cell; (4) the cell identity of the interfering cell; and/or (5) an indication that the WTRU 102 is experiencing interference.

The WTRU 102 may provide a portion or all of the parameter information to the serving cell or to the network. The parameter information may be provided by the WTRU 102 using: (1) an RRC connection request containing, for example, the ABS info, timing offset, and/or PCI/Cell ID of the interfering cell; (2) an indication to the network 200 that it is in an interference situation (e.g. via a one bit indication) and then reporting the parameter information in the RRC connection setup complete or waiting for an explicit request by the network 200 to send the indication, for example in the RRC Connection Setup or in any other messages; (3) the RRC Connection Setup Complete message to report (e.g., to only report) the parameter information, but may not send an indication in the RRC Connection request. The entire parameter information or a subset of the parameter information may be provided in the RRC connection setup complete message or into a report via a NAS message.

In certain representative embodiments, when the criteria is met (e.g., a determination of an interference situation), the WTRU 102 may report the situation to the network 200 by triggering a RRC connection request. The WTRU 102 may provide the information using any of the procedures described above.

In certain representative embodiments, the WTRU 102 may notify the network 200 of the interference situation using a RRC connection request message. Upon reception of this indication the network 200 may reject the connection request and may indicate (e.g., explicitly indicate) to the WTRU 102 in the RRC connection reject or RRC connection release (if a RRC Connection Setup complete is used for reporting the interference) to start using the acquired pattern (e.g. by using a one-bit confirmation) or a new provided pattern or set of patterns.

The WTRU 102 may provide the report to the network 200 (e.g., for information purposes), to allow the macro cell 210 to properly schedule any paging messages to ensure that the WTRU 102 successfully receives the respective paging messages. The notification may also be provided to the NAS for paging purposes either directly via the WTRU 102, or the eNB may notify the MME 142 that the WTRU 102 is in an interference situation. Similarly, when a radio link failure occurs, the ABS info or interference indication and/or neighboring aggressor cell info, if available, may be transmitted in an RLC re-establishment message.

Representative procedures may be used individually to determine the offset timing between the serving cell (e.g., a first pico cell 220) and the neighboring cell (e.g., a second pico cell 220, not shown). For example, the network 200 and/or the WTRU 102 may obtain the ABS pattern from, for example, the network nodes (e.g., the APs 225 of the first and second pico cells 220) communicating to each other, and/or the WTRU 102 may assist the network 200 in obtaining the timing difference between the two cells (e.g., serving cell 220 and neighboring cell 220) by notifying the serving cell and neighboring cell of the timing difference. The WTRU 102 or one of the network nodes 215, 225, or 235 may determine when to apply the patterns in the macro cell 210. The above-mentioned procedures may be used to instruct the WTRU 102 to acquire the timing difference between the cells and report it back to the network 200. The timing information acquisition may be used in conjunction with representative procedures described hereinabove. When the criterion described above is no longer met, the WTRU 102 may stop performing the actions described. For example, if the WTRU 102 is using an ABS pattern, the WTRU 102 may stop using the pattern or performing the paging actions indicated below. In certain representative embodiments, the WTRU 102 may send another report to the network 200 indicating that the interference situation has stopped.

It is contemplated that the above-mentioned procedures are also applicable to the case where an ABS pattern is not broadcasted, in which the serving cell may obtain the ABS info and patterns to the interfering cell via network interfaces.

The neighboring interference may impact the probability of proper paging reception in the WTRU 102 over the serving cell. The WTRU 102 may notify the network of the interference situation and the network 200 may use this information to increase the reliability of paging reception.

In a first representative embodiment, the network 200 and the WTRU 102 may modify the paging occasions or paging sub-frames such that the WTRU 102 may be paged in protected (or not interfered) sub-frames or paged such the probability of a paging occasion and frame falls in a non-interfered sub-frame may be increased. The WTRU 102 may report to the network 200 the ABS info or a subset of the ABS associated information and the network 200 may determine the ABS info of the aggressor cell. The WTRU 102 may notify the eNB 215 and/or the NAS or MME 142 of the interference situation, the aggressor cell, and/or the ABS info of the aggressor cell. The network may use this information to change the paging occasion or paging frames. The WTRU 102 may also change the paging occasions or frames according to any of representative procedures set forth below (e.g., either upon explicit indication by the network to start using one of the representative procedures or autonomously upon detecting that an interference situation has occurred).

In certain representative embodiments, the WTRU 102 may determine the new paging occasions or paging frames to monitor. For example, the interfered WTRUs 102 may use a new set of parameters to establish different paging occasions or paging frames. The new set of parameters may be broadcasted or provided (e.g., explicitly provided) to the WTRU 102 via dedicated RRC signaling. The WTRU 102 may use the broadcasted parameters when the criteria or criterion above are met or when the network indicates (e.g., explicitly indicates) to the WTRU 102 to start using the new parameters or when the RRC configures (e.g., explicitly configures) the WTRU 102 with the new set of parameters. A scaling value may be applied to the existing parameters, such that the scaling value may be broadcasted or signaled (e.g., explicitly signaled) to the WTRU 102 via RRC signaling.

The parameters that may be scaled and/or modified may include: (1) Discontinuous Reception (DRX) cycle (T), (2) default paging cycle (T), and/or (3) nB, among others. A new PCCH-Config for interfered WTRUs 102 may be added which may include default paging cycle and nB (for example, as described in TS 36.304 V10.3.0). The paging occasions within a paging frame (PF) may be increased for the interfered WTRUs 102 by changing the Ns (for example, as described in TS 36.304 V10.3.0) or by paging the WTRUs 102 in all allowed sub-frames (e.g., subframe 0, 4, 5, and 9). The Ns may be changed by either fixing Ns to a default parameter for interfered WTRUs 102 (e.g., always 4), or by changing the formula for interfered WTRUs 102 to be in the form of:

$$Ns = \max(x, Nb/T) \quad (2)$$

where x is a parameter to be used for interfered WTRUs 102; or $$Ns = \max(1, Nb/T, x) \quad (3)$$

where x is zero, if the WTRU is not interfered and a configured or predefined value (e.g., 2 or 4) for interfered WTRUs 102. A new set of paging subframes may enable paging of interfered WTRUs 102 (e.g., other than 0, 4, 5, 9). For example, a NS configuration may be added to a subframe pattern table.

The WTRU 102 may wake up and may be paged on a Paging Occasion (PO) on the next frame after the calculated paging frame (PF) that may correspond to a non-interfered subframe. For example, if all the POs within a PF correspond to interfered subframes, the WTRU 102 may wake up in the next frame or Nth frame, where N correspond to the allowed PF periodicity in the system, to monitor the given POs for a paging message. The network may be aware of the subframes that may be interfered with and may know to page the WTRU 102 in the next available sub-frames. For battery saving, the WTRU 102 may not monitor the POs that correspond to an interfered sub-frame.

In certain representative embodiments, the same parameters may be used, but the interfered WTRU 102 may wake up on the corresponding POs for N consecutive frames after the calculated PF. The network may page the WTRUs 102 during these consecutive frames on the corresponding POs.

The WTRU 102 may wake in the next sub-frame or the first non-interfered sub-frame after the last PO within the PF to receive a paging message.

For the eNB 215 to use the proper paging occasions and PFs for the interfered WTRUs 102 (e.g., interfered WTRUs only), the NAS may notify the eNB 215 to use the new parameters when a paging message is sent by the MME 142 to the eNB 215. The paging message sent over one or several tracking areas may indicate that the paged WTRU 102 is an interfered WTRU 102 and that the eNB 215 is to page the WTRU 102 according to the interfered WTRU 102 paging occasions and frames. The paging message may include a new IE to indicate that the paged WTRU 102 is an interfered WTRU 102 and that the eNB 215 is to page the WTRU 102 according to the interfered WTRU 102 paging occasions and frames.

In certain representative embodiments, the network may use this information to increase the paging robustness channels on the interfered subframes, for example, by increasing the aggregation level (i.e., decreasing coding rate) used for transmitting downlink control information associated to the paging message.

The representative embodiments disclosed herein may impact ABS mobility. Several procedures are outlined to allow the WTRU 102 to detect that the application of an ABS pattern is no longer required, and may report this information to the network. According to a first procedure, the WTRU 102 may transmit a message, such as a measurement report or another RRC message, when the signal received power (RSRP) or the signal received quality (RSRQ) of the non-allowed cell becomes lower than that of the serving cell minus an offset (e.g., in decibels (dB)). Such a trigger may be realized by defining a new event in the reporting configuration of the WTRU. The new event may include at least one of: (1) a non-allowed cell having an offset that exceeds (e.g., becomes more or worse than) that of a serving cell or a serving cell having an offset that becomes offset better or less than that of the non-allowed cell; and/or (2) a neighbor cell that becomes offset more or worse than a serving cell or a serving cell that becomes offset better or less than a neighbor cell. The reporting configuration may specify the identity of the concerned non-allowed or neighbor cell. The WTRU 102 may autonomously transmit a measurement report when the neighbor cell (e.g., associated with the ABS pattern currently applying) satisfies the condition.

The WTRU 102 may be configured with a reporting configuration including an event such as event A3 (e.g., a neighbor cell becomes offset better or less than a threshold) or A5 (e.g., with the reportOnLeave indication set). In certain representative embodiments, to allow restricting the use of the reportOnLeave indication for (e.g., only for) detecting a vicinity of a non-allowed cell, new events may be defined that apply (e.g., exclusively apply) to when the neighbor cell is a non-allowed cell. For instance, a new event "non-allowed cell becomes offset better than serving cell" may be defined and used in place of the event A3.

After the WTRU 102 has entered the vicinity of the non-allowed cell and has applied the corresponding ABS pattern for measurement purposes, the measured signal received quality and/or received power of the serving cell may improve to significantly and prematurely indicate that application of ABS pattern is no longer to be used). To ensure that a measurement report indicating that the WTRU 102 is no longer in the vicinity of the non-allowed cell is not triggered prematurely after the acquisition and application of the ABS pattern corresponding to the non-allowed cell, the WTRU 102 may: measure the RSRP or RSRQ of the serving cell and non-allowed cell over all possible subframes (e.g., by not applying the ABS pattern to measurements on the serving cell and the non-allowed cell) at least for evaluating the leaving condition of the event that may be triggered when the WTRU 102 entered the vicinity of the non-allowed cell; or, in case the WTRU 102 may be configured with the reportOnLeave indication, apply an offset for evaluating the leaving condition which is different (e.g., larger) than the offset used for evaluating the entering condition of the event that was triggered when the WTRU 102 entered the vicinity of the non-allowed cell. This offset may be provided by higher layers (e.g., along with the ABS pattern information) or may be derived from a property of the ABS pattern, such as the fraction of subframes that are almost blank during a period.

The message or measurement report triggered by one of the above embodiments may contain the measurement results of the corresponding measurement object and of the serving cell. The WTRU may include information such as the identity of the concerned non-allowed cell; and/or an indication of the corresponding ABS pattern currently being applied by the WTRU.

In certain representative embodiments, the WTRU 102 may autonomously stop, the application of an ABS pattern when it detects that it is no longer in the vicinity of the corresponding non-allowed cell. The detection may be based on any detection procedure set forth above.

In certain representative embodiments, the WTRU 102 may measure non-ABS subframes, even if the WTRU 102 is provided with (or has itself obtained) ABS patterns and may be accomplished when the WTRU 102 is under an acceptable level of interference. In certain representative embodiments, the WTRU 102 may use this measurement instances to actually trigger/start/activate the application of (or measurement on) ABS patterns. As an example, the WTRU 102 may perform RLM on ABS subframes (e.g., only ABS subframes) when strong interference is detected. Otherwise, the RLM may be performed triggering the enabling or disabling of the application of ABS (either triggering/signaling to the network that the WTRU 102 desires to use ABS, or the WTRU 102 is enabling or disabling ABS locally and may inform the network about the event).

Figure 2C:
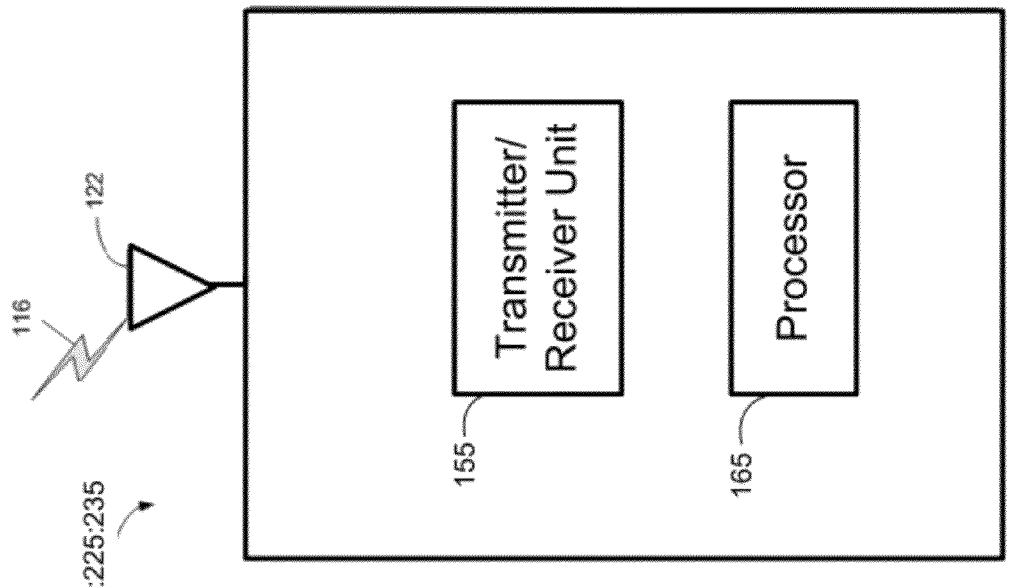
FIG. 2C is a block diagram of a representative wireless access point (WAP)
Figure 2B:
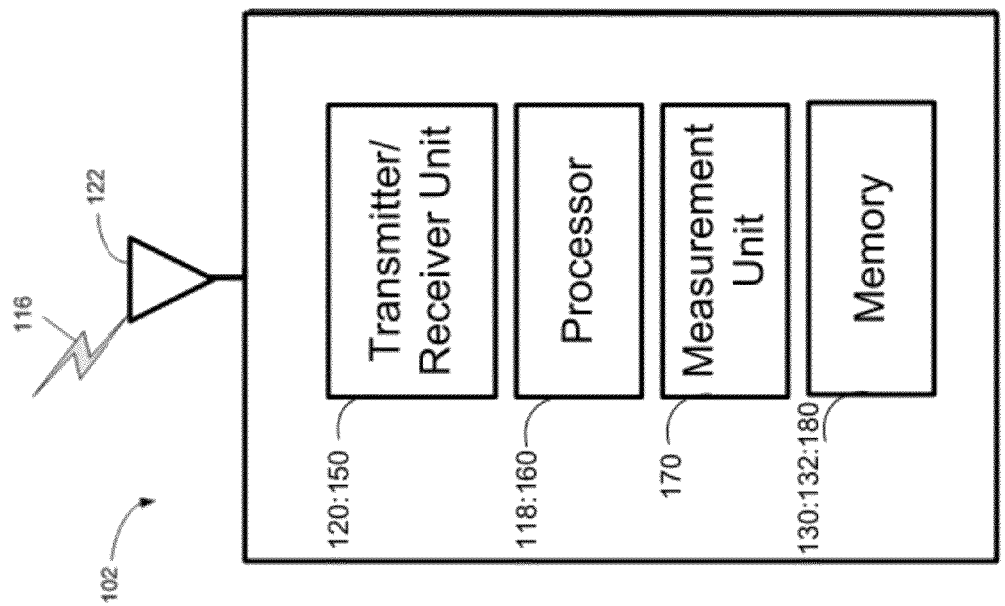
FIG. 2B is a block diagram of a representative WTRU.

FIG. 2B is block diagram of a representative WTRU.

Referring to FIG. 2B, the WTRU 102 may include: (1) a transmit/receive unit 120 or 150 configured to receive information indicating the ABS pattern with a plurality of ABS intervals of an interfering cell; (2) a processor 118 or 160 configured to determine timing associated with the ABS intervals of the interfering cell in accordance with the indicated ABS pattern; and to schedule a measurement opportunity, a transmission opportunity, or a reception opportunity during the ABS intervals of the interfering cell; (3) a memory 130, 132 and/or 180 configured to store predetermined access identifiers, each of the access identifiers indicating that the WTRU has access to a respective cell of the first type; and/or (4) a measurement unit 170 configured to measure cell quality during intervals in the determined measurement restriction intervals.

It is contemplated that the transmit/receive unit 120 or 150; the processor 118 or 160; the memory 130, 132 and/or 180; and/or the measurement unit 170 may be configured to enable functionality or operations disclosed herein to be implemented by the WTRU 102

FIG. 2C is a block diagram of a representative wireless access point (WAP) 215, 225 or 235

Referring to FIG. 2C, the WAP 215, 225 or 235 may include a transmit/receive unit 155 configured to receive information indicating the ABS pattern with a plurality of ABS intervals of an interfering cell; and a processor 165 configured to determine timing associated with the ABS intervals of the interfering cell in accordance with the indicated ABS pattern; and to schedule a transmission opportunity during the ABS intervals of the interfering cell. The transmit/receive unit 155 may be configured to send at least one of: one or more system information blocks, a master information block; or a paging message in accordance with the scheduled transmission opportunity the transmit/receive unit is configured to receive an ABS identifier that uniquely identifies the ABS pattern; and In certain representative embodiments, the processor 165 may be configured to look up the ABS identifier to determine the ABS pattern, and may determine subsequent intervals associated with the interfering cell that are the ABS intervals.

In certain representative embodiments the processor 165 may be configured to include the ABS pattern in the system information block; and the transmit/receive unit 155 may be configured to send the system information block to the WTRU.

In certain representative embodiments, the transmit/receive unit 155 may be configured to send the information indicating a common ABS pattern associated with any cells of a first type.

In certain representative embodiments, the WAP 215, 225 or 235 may be configured to communicate with the WTRU 102 and to use an almost blank subframe (ABS) pattern.

In certain representative embodiments the transmit/receive unit 155 may be configured to receive information indicating one ABS pattern of a plurality of ABS patterns; and the processor 165 may be configured to: (1) determine timing of paging occasions for paging the WTRU in accordance with ABS intervals of the indicated ABS pattern such that the transmit/receive unit 155 may send paging messages during the determined timing of the paging occasions.

Figure 3:
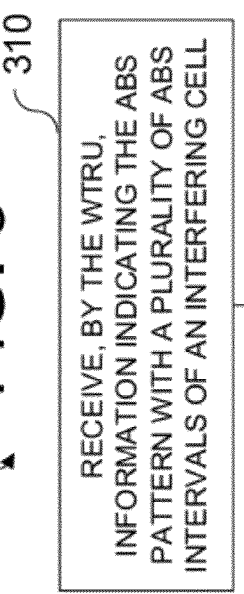
FIG. 3 is a flowchart illustrating a representative method.

FIG. 3 is a flow chart illustrating a representative method 300.

Referring to FIG. 3, the representative method 300 of scheduling operations by the WTRU 102 may use an ABS pattern. At block 310, the WTRU 102 may receive information indicating the ABS pattern with a plurality of ABS intervals of an interfering cell 230. At block 320, the WTRU 102 may determine timing associated with the ABS intervals of the interfering cell in accordance with the indicated ABS pattern. At block 330, the WTRU 102 may schedule a measurement opportunity, a transmission opportunity or a reception opportunity during the ABS intervals of the interfering cell 230

In certain representative embodiments, the WTRU 102 may receive an ABS identifier that uniquely identifies the ABS pattern.

In certain representative embodiments, the WTRU 102 may look up the ABS identifier to determine the ABS pattern, and may determine subsequent intervals associated with the interfering cell 230 that are the ABS intervals.

In certain representative embodiments, the WTRU 102 may receive a system information block, may detect whether the received system information block includes the information indicating the ABS pattern; and responsive to the received system information block including the information indicating the ABS pattern, may establish that a cell in a vicinity of the WTRU 102 is the interfering cell 230.

In certain representative embodiments, the WTRU 102 may broadcast, a capability indicator to indicate that the WTRU 102 has ABS management capability for scheduling measurement opportunities, transmission opportunities or reception opportunities during ABS intervals of an interfering cell.

In certain representative embodiments, the WTRU 102 may obtain the information indicating the ABS pattern from one of: (1) the interfering cell 230; or (2) a macro cell 210.

In certain representative embodiments, the WTRU 102 may obtain the information indicating a common ABS pattern associated with any cells 230 of a first type (e.g., CSG cells).

In certain representative embodiments, the WTRU 102 may store, in memory of the WTRU 102, predetermined access identifiers.

In certain representative embodiments, each of the access identifiers may indicate that the WTRU 102 has access to a respective cell 230 of the first type.

In certain representative embodiments, the WTRU 102 may receive an access identifier and a cell identifier associated with a cell 230 in a vicinity of the WTRU 102; may determining whether the received cell identifier corresponds to a range of cell identifiers associated with the first type of cell and whether the received access identifier corresponds to one of the predetermined access identifiers stored in the memory, as a determined result; and may establish that the cell in the vicinity of the WTRU 102 is the interfering cell 230 based on the determined result.

In certain representative embodiments, the respective cell of the first type may be a respective closed subscriber group (CSG) cell; the predetermined access identifier may be a CSG identifier indicating that the WTRU is permitted access to the respective CSG cell; and the received cell identifier may be a physical cell identifier.

In certain representative embodiments, a target cell in a vicinity of the WTRU 102 may be established as the interfering cell 230.

In certain representative embodiments, the WTRU 102 may detect the target cell using an autonomous search function.

In certain representative embodiments, a location of the WTRU 102 may be determined; and detection of the target cell may be triggered based on the determined location of the WTRU 102.

In certain representative embodiments, the WTRU 102 may measure cell quality of cells operating on a same frequency as the WTRU 102 that are in the vicinity of the WTRU 102; may rank the measured cells according to cell quality measurements; and may determine that the target cell, as best ranked cell among the measured cells, is the interfering cell 320.

In certain representative embodiments, the WTRU 102 may determine whether the target cell, as the best-ranked cell, has a quality measurement exceeding a first threshold and exceeding a serving cell by at least a second threshold.

In certain representative embodiments, the WTRU 102 may obtain cell identifiers of respective ones of cells of a first type together with information indicating a common ABS pattern for each of the respective ones of the cells of the first type.

In certain representative embodiments, the WTRU 102 may obtain information indicating a predefined ABS pattern, responsive to the WTRU being in idle mode.

In certain representative embodiments, the WTRU 102 may report, as interfering cell information, to a serving cell 210 serving the WTRU 102, at least one of: (1) ABS information associated with the interfering cell 230; (2) a timing offset associated with the interfering cell 230; (3) a physical cell identifier of the interfering cell 230; or (5) an indication that the WTRU 102 is encountering an interfering condition.

In certain representative embodiments, the WTRU 102 may trigger a report of the interfering cell information, responsive to: (1) an ABS triggering event being satisfied; (2) an ABS triggering condition being satisfied; or (3) a connection request, by the WTRU 102, being sent.

In certain representative embodiments, a radio resource control (RRC) connection request may include the interfering cell information.

In certain representative embodiments, the WTRU 102 may send a message having the indication that the WTRU 102 is encountering the interfering condition in one of: (1) a radio resource control message; or (2) a non-access stratum message.

In certain representative embodiments, the WTRU 102 may receive ABS information in a radio link control (RLC) re-establishment message after a radio link failure.

In certain representative embodiments, the WTRU 102 may receive an instruction to acquire a timing difference between the interfering cell and a serving cell 210 serving the WTRU 102; and may report to the serving cell 210 the timing difference.

In certain representative embodiments, the WTRU 102 may operate idle mode; and may send to the serving cell 210, a report indicating an interference condition.

In certain representative embodiments, the WTRU 102 may receive from the serving cell 210, a paging message during the ABS intervals.

In certain representative embodiments, the WTRU 102 may change paging occasions for detection of a paging message; may be awakened during the changed paging occasions; and may detect the paging message after the WTRU 102 is awakened.

In certain representative embodiments, the WTRU 102 may avoid interference by the interfering cell 230 of paging messages from the serving cell 210 by using the ABS intervals of the interfering cell 230.

In certain representative embodiments, the WTRU 102 may be awakened for a plurality of consecutive subframes based on paging messages scheduled to be sent by the serving cell 210 to the WTRU 102 during one or more paging occasions corresponding to the plurality of consecutive subframes.

In certain representative embodiments, the WTRU 102 may be awakened in a next subframe or a first non-interfered sub-frame after a last paging occasion within a paging frame to receive the paging message.

In certain representative embodiments, the WTRU 102 may receive from the serving cell 210, a scale value; may scale one or more parameters, as one or more scaled parameters; and may operate based on the one or more scaled parameters.

In certain representative embodiments, the one or more scaled parameters may include at least one of: (1) a discontinuous reception cycle parameter; (2) a default paging cycle parameter; or (3) an nB parameter.

In certain representative embodiments, the WTRU 102 may receive from the serving cell 210, an indication of a changed Paging Channel (PCCH) configuration; and may operate based on the received indication of the changed PCCH.

In certain representative embodiments, the WTRU 102 may determine measurement restriction intervals for restricting cell quality measurements; may measure cell quality during intervals in the determined measurement restriction intervals; and may send to the serving cell 210 information associated with the determined measurements of cell quality.

In certain representative embodiments, the respective ABSs from the interfering cell (e.g., or any cell) may include at least a Common Reference Signal (CRS).

In certain representative embodiments, the WTRU 102 may operate in one of: (1) connected mode; or (2) idle mode.

In certain representative embodiments, the WTRU 102 may exchange information relating to ABS patterns with a network.

In certain representative embodiments, ABS patterns may be defined based on received system frame number (SFN) information and broadcast channel information (BCH).

In certain representative embodiments, triggers may be defined to provide the WTRU 102 with ABS patterns.

In certain representative embodiments, a serving cell 210 and the WTRU 102 may exchange time information with respect to the ABS intervals.

In certain representative embodiments, the timing information with respect to the ABS intervals exchanged between a network node and the WTRU may pertain to: (1) the interfering cell, (2) one or more neighboring cells; (3) the serving cell; and/or (4) one or more small cells under coverage of the serving cell.

In certain representative embodiments, the timing information may be (1) an absolute timing value; or (2) a relative offset value, which is representative of the difference between a first value and a known reference value.

In certain representative embodiments, the ABS information may include at least the SFN together with the ABS pattern.

In certain representative embodiments, the ABS pattern and scheduled occurrences of ABS subframes, as measurement opportunities may be communicated (e.g., to the WTRU 102).

In certain representative embodiments, a first cell may communicate a reported offset of the SFN of a second cell to the WTRU 102 in a form of a difference compared to a reference value and the reference value may be the SFN of the first cell.

In certain representative embodiments, a subset of the total number of bits associated with the ABS pattern, as the indication of the ABS pattern, may be communicated to the WTRU 102.

In certain representative embodiments, the subset of the total number of bits in addition to at least two bits, as a frame offset in the information indicating the ABS pattern may be communicated (e.g., to the WTRU 102).

In certain representative embodiments, the WTRU 102 may be communicated multiple timing values.

In certain representative embodiments, the WTRU 102 may be configured to use ABS patterns or occurrences of subframes that recur or repeat every 40 subframes.

In certain representative embodiments, the first frame of the recurrence pattern (e.g., that coincides with frames where SFN mod 4=0) may be measured.

In certain representative embodiments, a timer or an offset value may be configured to coincide with a planned subframe or frame occurrence of the physical broadcast channel (PBCR).

In certain representative embodiments, the WTRU 102 may compute, expected occurrences of ABS subframes and expected occurrences of subframes; and may measure a target cell based on the computed occurrences.

In certain representative embodiments, subframes or frames may be scheduled for providing measurement opportunities to WTRUs 102 in the serving cell 210 or another cell 220 to occur at different recurrence intervals when compared to those of a further cell 230.

In certain representative embodiments, the number of subframes or frames providing measurement opportunities to a WTRU may be configured to be the same between a first cell and a second cell when observed over a given time period.

In certain representative embodiments, the WTRU 102 may be configured with a default ABS pattern and a pattern of scheduled occurrences for measurement opportunities.

In certain representative embodiments, the WTRU 102 may store a current ABS pattern or current measurement opportunity pattern in a memory.

In certain representative embodiments, the ABS pattern may be configured through (e.g., using) a first signaling message issued by a network node.

In certain representative embodiments, a signaling mechanism may be configured using a second signaling message transmitted between a network node and a WTRU.

In certain representative embodiments, the WTRU 102 may be updated with ABS patterns via a dedicated message or a broadcast message.

In certain representative embodiments, the WTRU 102 may transmit a measurement report message upon a condition that: (1) a non-allowed cell 230 (e.g., a CSG cell) may become offset worse than a serving cell; or (2) a signal received power (RSRP) or a signal received quality (RSRQ) of a non-allowed cell 230 may become lower than that of the serving cell 210 minus an offset.

In certain representative embodiments, the WTRU 102 may trigger a measurement report upon a condition that the WTRU 102 has entered a vicinity of a non-allowed cell 230.

In certain representative embodiments, the measurement report may contain the measurement results of the corresponding measurement objects of the serving cell 210.

In certain representative embodiments, the WTRU 102 may detect that the WTRU 102 is no longer in the vicinity of the interfering cell 230, as a non-allowed cell, as a detection result; and may autonomously stop an application of the ABS pattern in accordance with the detection result.

In certain representative embodiments, the WTRU 102 may measure non-ABS subframes upon a condition that the WTRU 102 is less than a threshold level of interference.

In certain representative embodiments, cell reselection in idle mode may be performed to acquire the ABS information of the target cell.

In certain representative embodiments, the acquired ABS information may be stored for future use.

In certain representative embodiments, the WTRU 102 may trigger a RRC connection request to report notifications to a serving network.

In certain representative embodiments, the WTRU 102 may modify paging occasions to provide the WTRU 102 with pages in protected subframes.

In certain representative embodiments, the modifying of the paging occasions may include changing the paging occasion to increase a probability of the paging occasion corresponding to a non-interfered subframe.

In certain representative embodiments, the WTRU 102 may notify an eNB of an interference condition.

In certain representative embodiments, the WTRU 102 may notify the eNB of an aggressor cell of the interference condition.

In certain representative embodiments, paging frames may be increased for the WTRU 102 experiencing the interference condition.

In certain representative embodiments, new paging subframes may be initiated to allow paging of the WTRU 102 experiencing the interference condition.

In certain representative embodiments, robustness of paging channels on interfered subframes may be increased.

Figure 4:
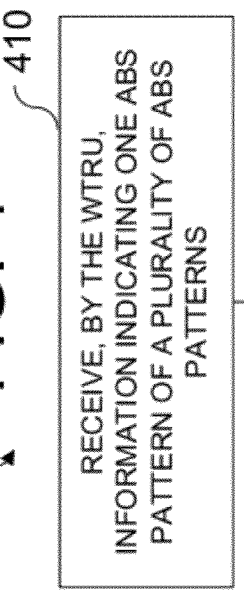
FIG. 4 is a flowchart illustrating another representative method.

FIG. 4 is a flow chart illustrating another representative method 400.

Referring to FIG. 4, the representative method 400 of scheduling measurements by the WTRU 102 may use an ABS pattern. At block 410, the WTRU 102 may receive information indicating one ABS pattern of a plurality of ABS patterns. At block 420, the WTRU 102 may determine timing of measurement intervals for measuring communication quality in accordance with the indicated ABS pattern. At block 430, the WTRU 102 may schedule measurements of communication quality during the determined measurement intervals.

In certain representative embodiments, the WTRU 102 may determine whether a cell 230 not serving the WTRU 102 is interfering with communications with a cell serving 210 of the WTRU 102; and may request a first operation mode for the serving cell 210 serving the WTRU 102 based on whether the cell 230 not serving the WTRU 210 is interfering with the WTRU 102.

FIG. 5 is a flow chart illustrating a further representative method 500.

Referring to FIG. 5, the representative method 500 may manage operation of the WTRU 102 served by a serving cell 210 in a vicinity of a further cell 230. At block 510, the WTRU 102 may determine whether the further cell 230 is interfering with communications between the WTRU 102 and the serving cell 210. At block 520, in response to a determination that the further cell 230 is interfering with the communications, the WTRU may determine an ABS pattern of the subframes and timing offset of the further cell 230, may notify the serving cell 210 of the ABS pattern and timing offset of the further cell 230; and may operate in a first mode in accordance with the determined ABS pattern and offset of the further cell 230.

In certain representative embodiments, the WTRU 102 may coordinate relative to the further cell 230 at least one of: (1) a wake-up of the WTRU 102 from power down intervals; (2) transmission of signaling; (3) reception of signaling; or (4) measurement of channel quality, responsive to operating in the first mode.

In certain representative embodiments, in response to a determination that the further cell 230 is not interfering with the communications, the WTRU 102 may operate in a second mode in which transmission of signaling, reception of signaling and measurement of channel quality are uncoordinated relative to the further cell 230.

FIG. 6 is a flow chart illustrating an additional representative method 600.

Referring to FIG. 6, the representative method 600 may schedule transmission or reception by the WTRU using the ABS patterns. At block 610, the WTRU 102 may acquire ABS information of a target cell indicating an ABS pattern having a plurality of ABS intervals. At block 620, the WTRU may determine whether to initiate using the acquired ABS pattern for timing of communications based on the acquired ABS information. At block 630, the WTRU may schedule transmission or reception based on the ABS pattern, responsive to a determination to initiate using the acquired ABS pattern.

FIG. 7 is a flow chart illustrating yet another representative method 700.

Referring to FIG. 7, the representative method 700 may include, at block 710, the WTRU 102 determining that the WTRU 102 is being interfered by a neighboring cell. At block 720, ABS information may be acquired indicating at least one ABS pattern with a plurality of ABS intervals of an interfering cell or at least one subset of the ABS pattern with one or more of the plurality of ABS intervals, the ABS intervals indicating measurement restrictions or communication opportunities associated with the ABS intervals.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WRTU), user equipment (UE), terminal, base station, Mobility Management Entity (MME) or Evolved Packet Core (EPC), or any host computer. The WRTU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Embodiments

In one embodiment, a method of scheduling operations by a wireless transmit/receive unit (WTRU) using an almost blank subframe (ABS) pattern, may comprise: determining, by the WTRU that the WTRU is being interfered by a neighboring cell; and acquiring ABS information indicating at least one ABS pattern with a plurality of ABS intervals of an interfering cell or at least one subset of the ABS pattern with one or more of the plurality of ABS intervals, the ABS intervals indicating measurement restrictions or communication opportunities associated with the ABS intervals.

In some embodiments, the acquiring of the ABS information indicating at least one subset of the ABS pattern may include receiving, by the WTRU, the ABS information associated with one or more measurement restriction patterns.

In some embodiments, the method may further comprise restricting the WTRU to obtain measurements during one or more subframes based on the ABS interval or intervals indicated by the acquired ABS information.

In some embodiments, the method may further comprise determining, by the WTRU, timing associated with the ABS intervals of the interfering cell in accordance with the indicated ABS patterns or indicated measurement restriction patterns.

In some embodiments, the method may further comprise scheduling, by the WTRU, a measurement opportunity, a transmission opportunity or a reception opportunity during the ABS intervals of the interfering cell.

In some embodiments, the method may further comprise: operating the WTRU in idle mode; and sending, by the WTRU to a serving cell, a report indicating an interference condition.

In some embodiments, the method may further comprise: receiving an indication to initiate the measurements according to a measurement restriction pattern; and initiating, by the WTRU, the measurements based on the received indication.

In some embodiments, the method may further comprise: receiving an indication to change paging message detection times for detection of a paging message; and changing, by the WTRU, the paging message detection times based on the received indication.

In some embodiments, the method may further comprise performing measurements on one of: (1) a serving cell on allowed subframes received in a serving cell measurement restriction pattern; or (2) a neighboring cell or a set of neighboring cells on the allowed subframes indicated in an acquired neighboring cell measurement restriction pattern.

In some embodiments, the method may further comprise: changing paging message detection times for detection of a paging message; awakening the WTRU prior to the changed paging message detection times; and detecting, by the WTRU, the paging message after the WTRU is awakened.

In some embodiments, the awakening of the WTRU may include awakening of the WTRU in: one of: (1) a plurality of consecutive subframes based on paging messages scheduled to be sent by the serving cell to the WTRU prior to one or more paging occasions corresponding to the plurality of consecutive subframes; or (2) a next subframe or a first non-interfered sub-frame after a last paging occasion within a paging frame to receive the paging message.

In some embodiments, the changing of the paging message detection times may include changing the paging message detection times according to a set of parameters received by the WTRU when an interference condition is detected.

In some embodiments, the determining that the WTRU is being interfered by the neighboring cell may include detecting that an interference condition exists when a quality of the neighboring cell becomes better than a quality of a serving cell by a threshold.

In some embodiments, the determining that the WTRU is being interfered by the neighboring cell may further include establishing at least one of: (1) the WTRU is not allowed to reselect to the neighboring cell; or (2) the quality of the neighboring cell has been better than the quality of the serving cell for at least a threshold period.

In some embodiments, the method may further comprise: detecting, by the WTRU, that the WTRU is no longer in a vicinity of the interfering cell, as a detection result; and stopping, by the WTRU, an application of the ABS pattern in accordance with the detection result.

In some embodiments, the determining that the WTRU is being interfered by the neighboring cell may include detecting that an interference condition exists when a cell reselection criteria is met for a non-allowed closed subscriber group (CSG) cell.

In one embodiment, a method of managing operation of a wireless transmit/receive unit (WTRU) served by a serving cell in a vicinity of a neighboring cell may comprise: determining, by the WTRU, whether the neighboring cell is interfering with communications between the WTRU and the serving cell; and in response to a determination that the further cell is interfering with the communications, (1) determining a subset of the ABS pattern of the subframes and timing offset of the further cell; (2) notifying, by the WTRU, the serving cell of the subset of the ABS pattern of the subframes and timing offset of the further cell; and (3) operating, by the WTRU in a first mode in accordance with the determined subset of the ABS pattern and offset of the further cell.

In some embodiments, the method may further comprise coordinating, by the WTRU, relative to the further cell at least one of: (1) wake-up of the WTRU from power down intervals; (2) transmission of signaling; (3) reception of signaling; or (4) measurement of channel quality, responsive to operating in the first mode.

In some embodiments, the method may further comprise in response to a determination that the further cell is not interfering with the communications, operating, by the WTRU, in a second mode in which transmission of signaling, reception of signaling and measurement of channel quality are uncoordinated relative to the further cell.

In one embodiment, a method of scheduling transmission or reception by a wireless transmit/receive unit (WTRU) using almost blank subframe (ABS) patterns may comprise: acquiring, by the WTRU, ABS information of a target cell indicating a subset of an ABS pattern having a plurality of ABS intervals; determining, by the WTRU, whether to initiate using the indicated subset of the ABS pattern for timing of communications based on the acquired ABS information; and scheduling, by the WTRU, a measurement, a transmission or a reception based on the subset of the ABS pattern, responsive to a determination to initiate using the indicated subset of the ABS pattern.

In some embodiments, the determining of whether to initiate using the acquired ABS pattern for timing of communications may include: establishing one or more triggering events or triggering conditions, as a trigger, to initiate using the indicated ABS pattern based on the acquired ABS information, the method further comprising: scheduling, by the WTRU, measurement opportunities, transmission opportunities or reception opportunities regardless of timing of the ABS intervals of an interfering cell, prior to an event or a condition satisfying the trigger; and scheduling, by the WTRU, the measurement opportunities, reception of master information blocks, or reception of system information blocks during timing of the ABS intervals of the interfering cell, subsequent to the event or the condition satisfying the trigger.

In one embodiment, a wireless transmit/receive unit (WTRU) configured to use an almost blank subframe (ABS) pattern may comprise: a processor configured to determine that the WTRU is being interfered by a neighboring cell; and a transmit/receive unit configured to acquire ABS information indicating: (1) at least one ABS pattern with a plurality of ABS intervals of an interfering cell; or (2) at least one subset of the ABS pattern with one or more of the plurality of ABS intervals, the ABS intervals indicating measurement restrictions or communication opportunities associated with the ABS intervals.

In some embodiments, the processor may be configured to restrict the WTRU to obtain measurements during one or more subframes based on the ABS interval or intervals indicated by the ABS information acquired by the transit/receive unit.

In some embodiments, the processor may operate in idle mode and the transmit/receive unit may send to a serving cell a report indicating any interference condition.

In some embodiments, responsive to the transmit/receive unit receiving an indication to initiate measurements according to a measurement restriction pattern, the processor may initiate measurements based on the received indication.

In some embodiments, responsive to the transmit/receive unit receiving an indication to change paging message detection times for detection of a paging message, the processor may change the paging message detection times based on the received indication.

In one embodiments, a wireless transmit/receive unit (WTRU) using almost blank subframe (ABS) patterns may comprise: a transmit/receive unit configured to acquire ABS information of a target cell indicating an ABS pattern having a plurality of ABS intervals; and a processor configured to: (1) determine whether to initiate using the indicated ABS pattern for timing of communications based on the acquired ABS information; and (2) schedule a measurement, a transmission or a reception based on the indicated ABS pattern, responsive to a determination to initiate using the acquired ABS pattern.

In one embodiment, a method of scheduling operations by a wireless transmit/receive unit (WTRU) using an almost blank subframe (ABS) pattern may comprise: receiving, by the WTRU, information indicating the ABS pattern with a plurality of ABS intervals of an interfering cell; determining, by the WTRU, timing associated with the ABS intervals of the interfering cell in accordance with the indicated ABS pattern; and scheduling, by the WTRU, a measurement opportunity, a transmission opportunity or a reception opportunity during the ABS intervals of the interfering cell.

In some embodiments, the receiving of the information indicating the ABS pattern may include receiving an ABS identifier that uniquely identifies the ABS pattern; the determining of the timing associated with the ABS intervals may include: looking up the ABS identifier to determine the ABS pattern, and determining subsequent intervals associated with the interfering cell that are the ABS intervals.

In some embodiments, the receiving of the information indicating the ABS pattern may include receiving a system information block.

In some embodiments, the method may further comprise: detecting, by the WTRU, whether the received system information block includes the information indicating the ABS pattern; and responsive to the received system information block including the information indicating the ABS pattern, establishing that a cell in a vicinity of the WTRU is the interfering cell.

In some embodiments, the method may further comprise: broadcasting, by the WTRU, a capability indicator to indicate that the WTRU has ABS management capability for scheduling measurement opportunities, transmission opportunities or reception opportunities during ABS intervals of an interfering cell.

In some embodiments, the receiving of the information indicating the ABS pattern may include obtaining the information indicating the ABS pattern from one of: (1) the interfering cell; or (2) a macro cell.

In some embodiments, the receiving of the information indicating the ABS pattern with a plurality of ABS intervals of the interfering cell may include obtaining the information indicating a common ABS pattern associated with any cells of a first type.

In some embodiments, the method may further comprise: storing, in memory of the WTRU, predetermined access identifiers, each of the access identifiers indicating that the WTRU has access to a respective cell of a first type; receiving, by the WTRU, an access identifier and a cell identifier associated with a cell in a vicinity of the WTRU; determining whether the received cell identifier corresponds to a range of cell identifiers associated with the first type of cell and whether the received access identifier corresponds to one of the predetermined access identifiers stored in the memory, as a determined result; and establishing that the cell in the vicinity of the WTRU is the interfering cell based on .the determined result.

In some embodiments, the respective cell of the first type may be a respective closed subscriber group (CSG) cell; the predetermined access identifier may be a CSG identifier indicating that the WTRU is permitted access to the respective CSG cell; and the received cell identifier may be a physical cell identifier.

In some embodiments, the method may further comprise establishing that a target cell in a vicinity of the WTRU is the interfering cell.

In some embodiments, the method may further comprise detecting, by the WTRU, the target cell using an autonomous search function.

In some embodiments, the method may further comprise: determining a location of the WTRU; and triggering detection of the target cell based on the determined location of the WTRU.

In some embodiments, the establishing that the target cell in the vicinity of the WTRU is the interfering cell may include: measuring cell quality of cells operating on a same frequency as the WTRU that are in the vicinity of the WTRU; ranking the measured cells according to cell quality measurements; and determining that the target cell, as best ranked cell among the measured cells, is the interfering cell.

In some embodiments the determining that the target cell, as the best ranked among the measured cells, is the interfering cell may include determining whether the target cell, as the best-ranked cell, has a quality measurement exceeding a first threshold and exceeding a serving cell by at least a second threshold.

In some embodiments, the receiving of the information indicating the ABS pattern may include obtaining cell identifiers of respective ones of cells of a first type together with information indicating a common ABS pattern for each of the respective ones of the cells of the first type.

In some embodiments, the receiving of the information indicating one ABS pattern may include obtaining information indicating a predefined ABS pattern, responsive to the WTRU being in idle mode.

In some embodiments, the method may further comprise reporting, as interfering cell information, by the WTRU to a serving cell serving the WTRU, at least one of: (1) ABS information associated with the interfering cell; (2) a timing offset associated with the interfering cell; (3) a physical cell identifier of the interfering cell; or (5) an indication that the WTRU is encountering an interfering condition.

In some embodiments, the method may further comprise triggering, by the WTRU, a report of the interfering cell information, responsive to: (1) an ABS triggering event being satisfied; (2) an ABS triggering condition being satisfied; or (3) a connection request, by the WTRU, being sent.

In some embodiments, the method may further comprise including in a radio resource control (RRC) connection request the interfering cell information.

In some embodiments, the method may further comprise sending, by the WTRU, a message having the indication that the WTRU is encountering the interfering condition in one of: (1) a radio resource control message; or (2) a non-access stratum message.

In some embodiments, the method may further comprise receiving, by the WTRU, ABS information in a radio link control (RLC) re-establishment message after a radio link failure.

In some embodiments, the method may further comprise receiving, by the WTRU, an instruction to acquire a timing difference between the interfering cell and a serving cell serving the WTRU; and reporting, by the WTRU to the serving cell, the timing difference.

In some embodiments, the method may further comprise: operating the WTRU in idle mode; and sending, by the WTRU to a serving cell, a report indicating an interference condition.

In some embodiments, the method may further comprise receiving, by the WTRU from the serving cell, a paging message during the ABS intervals.

In some embodiments, the method may further comprise: changing paging occasions for detection of a paging message; awakening the WTRU during the changed paging occasions; and detecting, by the WTRU, the paging message after the WTRU is awakened.

In some embodiments, the changing of the paging occasions for detection of the paging message may include: avoiding interference by the interfering cell by paging messages from the serving cell using the ABS intervals of the interfering cell.

In some embodiments, the awakening of the WTRU may include awakening of the WTRU for a plurality of consecutive subframes based on paging messages scheduled to be sent by the serving cell to the WTRU during one or more paging occasions corresponding to the plurality of consecutive subframes.

In some embodiments, the awakening of the WTRU may include awakening of the WTRU in a next subframe or a first non-interfered sub-frame after a last paging occasion within a paging frame to receive the paging message.

In some embodiments, the method may further comprise receiving, by the WTRU from the serving cell, an indication of a changed Paging Channel (PCCH) configuration; and operating the WTRU based on the received indication of the changed PCCH.

In some embodiments, the method may further comprise receiving, by the WTRU from a serving cell, a scale value; scaling, by the WTRU, one or more parameters, as one or more scaled parameters; and operating the WTRU based on the one or more scaled parameters, wherein the one or more scaled parameters may include at least one of: (1) a discontinuous reception cycle parameter; (2) a default paging cycle parameter; or (3) an nB parameter.

In some embodiments, the determining of timing associated with the ABS intervals of the interfering cell may include determining measurement restriction intervals for restricting cell quality measurements by the WTRU.

In some embodiments, the method may further comprise: measuring, cell quality during intervals in the determined measurement restriction intervals; and sending, by the WTRU to the serving cell, information associated with the determined measurements of cell quality.

In some embodiments, respective ABSs from the interfering cell include at least a Common Reference Signal (CRS).

In some embodiments, the method may further comprise operating, by the WTRU, in one of: (1) connected mode; or (2) idle mode.

In some embodiments, the method may further comprise exchanging information relating to ABS patterns with a network.

In some embodiments, the method may further comprise defining ABS patterns based on received system frame number (SFN) information and broadcast channel information (BCH).

In some embodiments, the method may further comprise: defining triggers to provide the WTRU with ABS patterns.

In some embodiments, the method may further comprise a serving cell and the WTRU exchanging time information with respect to the ABS intervals.

In some embodiments, the timing information with respect to the ABS intervals exchanged between a network node and the WTRU may pertain to at least one of: (1) the interfering cell, (2) one or more neighboring cells; (3) the serving cell; or (4) one or more small cells under coverage of the serving cell.

In some embodiments, the timing information may be one of: (1) an absolute timing value; or (2) a relative offset value, which is representative of the difference between a first value and a known reference value.

In some embodiments, the receiving of the information indicating the ABS pattern with a plurality of ABS intervals of an interfering cell may include receiving a system frame number (SFN) in the information together with the ABS pattern.

In some embodiments, the method may further comprise communicating the ABS pattern and scheduled occurrences of ABS subframes, as measurement opportunities.

In some embodiments, the method may further comprise communicating a reported offset of the SFN of a second cell to the WTRU by a first cell in a form of a difference compared to a reference value, wherein the reference value is the SFN of the first cell.

In some embodiments, the method may further comprise communicating, as the indication of the ABS pattern, a subset of the total number of bits associated with the ABS pattern.

In some embodiments, the method may further comprise communicating the subset of the total number of bits in addition to at least two bits, as a frame offset in the information indicating the ABS pattern.

In some embodiments, the method may further comprise communicating multiple timing values to the WTRU.

In some embodiments, the method may further comprise configuring the measuring of ABS patterns or occurrences of subframes to recur every 40 subframes.

In some embodiments, the method may further comprise measuring the first frame of the recurrence pattern that coincides with frames where SFN mod 4=0.

In some embodiments, the method may further comprise configuring a timer or offset value to coincide with a planned subframe or frame occurrence of the physical broadcast channel (PBCR).

In some embodiments, the method may further comprise computing, by the WTRU, expected occurrences of ABS subframes and expected occurrences of subframes; and measuring a target cell based on the computed occurrences.

In some embodiments, the method may further comprise scheduling subframes or frames for providing measurement opportunities to WTRUs in the serving cell or another cell to occur at different recurrence intervals when compared to those of a further cell.

In some embodiments, the number of subframes or frames providing measurement opportunities to a WTRU may be configured to be the same between a first cell and a second cell when observed over a given time period.

In some embodiments, the WTRU may be configured with a default ABS pattern and a pattern of scheduled occurrences for measurement opportunities.

In some embodiments, the method may further comprise storing a current ABS pattern or current measurement opportunity pattern in a memory of the WTRU.

In some embodiments, the method may further comprise configuring the ABS pattern through a first signaling message issued by a network node.

In some embodiments, the method may further comprise configuring a signaling mechanism using a second signaling message transmitted between a network node and a WTRU.

In some embodiments, the method may further comprise updating the WTRU with ABS patterns via a dedicated message or a broadcast message.

In some embodiments, a non-allowed cell becomes offset worse than a serving cell.

In some embodiments, the method may further comprise transmitting, by the WTRU, a measurement report message upon a condition that a signal received power (RSRP) or a signal received quality (RSRQ) of a non-allowed cell becomes lower than that of the serving cell minus an offset.

In some embodiments, the method may further comprise triggering, by the WTRU, a measurement report upon a condition that the WTRU has entered a vicinity of a non-allowed cell.

In some embodiments, the measurement report triggered may contain the measurement results of the corresponding measurement objects of the serving cell.

In some embodiments, the method may further comprise: detecting, by the WTRU, that the WTRU is no longer in the vicinity of the interfering cell, as a non-allowed cell, as a detection result; and autonomously stopping, by the WTRU, an application of the ABS pattern in accordance with the detection result.

In some embodiments, the method may further comprise measuring, by the WTRU, during non-ABS subframes upon a condition that the WTRU is less than a threshold level of interference.

In some embodiments, the method may further comprise performing cell reselection in idle mode to acquire the ABS information of the target cell.

In some embodiments, the method may further comprise storing the acquired ABS information for future use.

In some embodiments, the method may further comprise triggering, by the WTRU, a RRC connection request to report notifications to a serving network.

In some embodiments, the method may further comprise modifying, by the WTRU, paging occasions to provide the WTRU with pages in protected subframes.

In some embodiments, the modifying of the paging occasions may include changing the paging occasion to increase a probability of the paging occasion corresponding to a non-interfered subframe.

In some embodiments, the method may further comprise notifying, by the WTRU, an eNB of an interference condition.

In some embodiments, the method may further comprise notifying, by the WTRU, an eNB of an interference condition of an aggressor cell.

In some embodiments, the method may further comprise increasing paging frames for the WTRU experiencing the interference condition.

In some embodiments, the method may further comprise initiating new paging subframes to allow paging of the WTRU experiencing the interference condition.

In some embodiments, the method may further comprise increasing robustness of paging channels on interfered subframes.

In one embodiment, a method of scheduling measurements by a wireless transmit/receive unit (WTRU) using almost blank subframe (ABS) patterns, may comprise: receiving, by the WTRU, information indicating one ABS pattern of a plurality of ABS patterns; determining, by the WTRU, timing of measurement intervals for measuring communication quality in accordance with the indicated ABS pattern; and scheduling, by the WTRU, measurements of communication quality during the determined measurement intervals.

In some embodiments, the method may further comprise: determining, by the WTRU, whether a cell not serving the WTRU is interfering with communications with a cell serving of the WTRU; and requesting, by the WTRU, a first operation mode for the serving cell serving the WTRU based on whether the cell not serving the WTRU is interfering with the WTRU.

In some embodiments, the method may further comprise respective ABSs from the interfering cell include at least a Common Reference Signal (CRS).

In some embodiments, the method may further comprise operating, by the WTRU, in one of: (1) connected mode; or (2) idle mode.

In one embodiment, a method of managing operation of a wireless transmit/receive unit (WTRU) served by a serving cell in a vicinity of a further cell, may comprise: determining, by the WTRU, whether the further cell is interfering with communications between the WTRU and the serving cell; and in response to a determination that the further cell is interfering with the communications, (1) determining an ABS pattern of the subframes and timing offset of the further cell; (2) notifying, by the WTRU, the serving cell of the ABS pattern and timing offset of the further cell; and (3) operating, by the WTRU in a first mode in accordance with the determined ABS pattern and offset of the further cell.

In some embodiments, the method may further comprise coordinating, by the WTRU, relative to the further cell at least one of: (1) wake-up of the WTRU from power down intervals; (2) transmission of signaling; (3) reception of signaling; or (4) measurement of channel quality, responsive to operating in the first mode.

In some embodiments, the method may further comprise in response to a determination that the further cell is not interfering with the communications, operating, by the WTRU, in a second mode in which transmission of signaling, reception of signaling and measurement of channel quality are uncoordinated relative to the further cell.

In one embodiment, a method of scheduling transmission or reception by a wireless transmit/receive unit (WTRU) using almost blank subframe (ABS) patterns, may comprise: acquiring, by the WTRU, ABS information of a target cell indicating an ABS pattern having a plurality of ABS intervals; determining, by the WTRU, whether to initiate using the acquired ABS pattern for timing of communications based on the acquired ABS information; and scheduling, by the WTRU, transmission or reception based on the ABS pattern, responsive to a determination to initiate using the acquired ABS pattern.

In some embodiments, the method may further comprise establishing, by the WTRU, at least one of: (1) a measurement restriction during the ABS intervals; (2) paging message receptions during the ABS intervals; (3) system information block reception during the ABS intervals; or (4) master information block reception during the ABS intervals.

In some embodiments, the determining of whether to initiate using the acquired ABS pattern for timing of communications may include: establishing one or more triggering events or triggering conditions, as a trigger, to initiate using the acquired ABS pattern based on the acquired ABS information.

In some embodiments, the method may further comprise scheduling, by the WTRU, measurement opportunities, transmission opportunities or reception opportunities regardless of timing of ABS intervals of the interfering cell, prior to an event or a condition satisfying the trigger; and scheduling, by the WTRU, measurement opportunities, reception of master information blocks, or reception of system information blocks during timing of ABS intervals of the interfering cell, subsequent to the event or the condition satisfying the trigger.

In one embodiment, a wireless transmit/receive unit (WTRU) configured to use an almost blank subframe (ABS) pattern, may comprise: a transmit/receive unit configured to receive information indicating the ABS pattern with a plurality of ABS intervals of an interfering cell; and a processor configured to determine timing associated with the ABS intervals of the interfering cell in accordance with the indicated ABS pattern; and to schedule a measurement opportunity, a transmission opportunity, or a reception opportunity during the ABS intervals of the interfering cell.

In some embodiments, the transmit/receive unit may be configured to receive an ABS identifier that uniquely identifies the ABS pattern; and the processor may be configured to look up the ABS identifier to determine the ABS pattern, and determines subsequent intervals associated with the interfering cell that is the ABS intervals.

In some embodiments, the transmit/receive unit may be configured to receive a system information block; and the processor may be configured to: (1) detect whether the received system information block includes the information indicating the ABS pattern; and responsive to the received system information block including the information indicating the ABS pattern, (2) establish that a cell in a vicinity of the WTRU is the interfering cell.

In some embodiments, the transmit/receive unit may be configured to broadcast a capability indicator to indicate that the WTRU has ABS management capability for scheduling measurement opportunities, transmission opportunities or reception opportunities during ABS intervals of an interfering cell.

In some embodiments, the transmit/receive unit may be configured to obtain the information indicating the ABS pattern from one of: (1) the interfering cell; or (2) a macro cell.

In some embodiments, the transmit/receive unit may be configured to obtain the information indicating a common ABS pattern associated with any cells of a first type.

In some embodiments, the WTRU may further comprise a memory configured to store predetermined access identifiers, each of the access identifiers indicating that the WTRU has access to a respective cell of the first type, wherein the transmit/receive unit may be configured to receive an access identifier and a cell identifier associated with a cell in a vicinity of the WTRU; and the processor may be configured: (1) to determine whether the received cell identifier corresponds to a range of cell identifiers associated with the first type of cell and whether the received access identifier corresponds to one of the predetermined access identifiers stored in the memory, as a determined result; and (2) to establish that the cell in the vicinity of the WTRU is the interfering cell based on .the determined result.

In some embodiments, the processor may be configured to establish that a target cell in a vicinity of the WTRU is the interfering cell.

In some embodiments, the processor may be configured to detect the target cell using an autonomous search function.

In some embodiments, the processor may be configured: (1) to determine a location of the WTRU, and (2) to trigger detection of the target cell based on the determined location of the WTRU.

In some embodiments, the WTRU may further comprise a measurement unit configured to measure cell quality of cells operating on a same frequency as the WTRU that are in the vicinity of the WTRU, wherein the processor may be configured to: (1) rank the measured cells according to cell quality measurements, and (2) determine that the target cell, as best ranked cell among the measured cells, is the interfering cell.

In some embodiments, the processor may be configured to determine whether the target cell, as the best-ranked cell, has a quality measurement exceeding a first threshold and exceeding a serving cell by at least a second threshold.

In some embodiments, the transmit/receive unit may be configured to obtain cell identifiers of respective ones of cells of a first type together with information indicating a common ABS pattern for each of the respective ones of the cells of the first type.

In some embodiments, the transmit/receive unit may be configured to obtain information indicating a predefined ABS pattern, responsive to the WTRU being in idle mode.

In some embodiments, the transmit/receive unit may be configured to report, as interfering cell information, to a serving cell serving the WTRU, at least one of: (1) ABS information associated with the interfering cell; (2) a timing offset associated with the interfering cell; (3) a physical cell identifier of the interfering cell; or (5) an indication that the WTRU is encountering an interfering condition.

In some embodiments, the processor may be configured to trigger a report of the interfering cell information, responsive to: (1) an ABS triggering event being satisfied; (2) an ABS triggering condition being satisfied; or (3) a connection request being sent.

In some embodiments, the processor may be configured to include the interfering cell information in a radio resource control (RRC) connection request.

In some embodiments, the transmit/receive unit may be configured to send a message having the indication that the WTRU is encountering the interfering condition in one of: (1) a radio resource control message; or (2) a non-access stratum message.

In some embodiments, the transmit/receive unit may be configured to receive ABS information in a radio link control (RLC) re-establishment message after a radio link failure.

In some embodiments, the transmit/receive unit may be configured to receive an instruction to acquire a timing difference between the interfering cell and a serving cell serving the WTRU; and reporting, by the WTRU to the serving cell, the timing difference.

In some embodiments, the processor may be configured to operate the WTRU in idle mode; and the transmit/receive unit may be configured to send to the serving cell, a report indicating an interference condition.

In some embodiments, the transmit/receive unit may be configured to receive from the serving cell, a paging message during the ABS intervals.

In some embodiments, 106 the processor may be configured to: (1) change paging occasions for detection of a paging message; (2) awaken the WTRU during the changed paging occasions; and (3) detect the paging message after the WTRU is awakened.

In some embodiments, the processor may be configured to avoid interference by the interfering cell of paging messages from the serving cell using the ABS intervals of the interfering cell.

In some embodiments, the processor may be configured to awaken the WTRU for a plurality of consecutive subframes based on paging messages scheduled to be sent by the serving cell to the WTRU during one or more paging occasions corresponding to the plurality of consecutive subframes.

In some embodiments, the processor may be configured to awaken the WTRU in a next subframe or a first non-interfered sub-frame after a last paging occasion within a paging frame to receive the paging message.

In some embodiments, the transmit/receive unit may be configured to receive from the serving cell, a scale value; the processor may be configured to: (1) scale one or more parameters, as one or more scaled parameters; and (2) operate the WTRU based on the one or more scaled parameters such that the one or more scaled parameters includes at least one of: (i) a discontinuous reception cycle parameter; (ii) a default paging cycle parameter; or (iii) an nB parameter.

In some embodiments, the transmit/receive unit may be configured to receive from the serving cell, an indication of a changed Paging Channel (PCCH) configuration; and the processor may be configured to operate the WTRU based on the received indication of the changed PCCH.

In some embodiments, the processor may be configured to determine measurement restriction intervals for restricting cell quality measurements by the WTRU In some embodiments, the WTRU may include a measurement unit configured to measure cell quality during intervals in the determined measurement restriction intervals.

In some embodiments, the transmit/receive unit may be configured to send to the serving cell, information associated with the determined measurements of cell quality.

In one embodiment, a wireless transmit/receive unit (WTRU) WTRU configured to use almost blank subframe (ABS) patterns, may comprise: a transmit/receive unit configured to receive information indicating one ABS pattern of a plurality of ABS patterns; and a processor configured to: (1) determine timing of measurement intervals for measuring communication quality in accordance with the indicated ABS pattern, and (2) schedule measurements of communication quality during the determined measurement intervals.

In one embodiment, a wireless transmit/receive unit (WTRU) WTRU served by a serving cell in a vicinity of a further cell, may comprise: a processor configured to: (1) determine whether the further cell is interfering with communications between the WTRU and the serving cell, and (2) in response to a determination that the further cell is interfering with the communications, determine an ABS pattern of the subframes and timing offset of the further cell; and a transmit/receive unit configured to notify the serving cell of the ABS pattern and timing offset of the further cell such that the processor operates in a first mode in accordance with the determined ABS pattern and timing offset of the further cell.

In one embodiment, a wireless transmit/receive unit (WTRU) WTRU using almost blank subframe (ABS) patterns, may comprise: a transmit/receive unit configured to acquire ABS information of a target cell indicating an ABS pattern having a plurality of ABS intervals; and a processor configured to: (1) determine whether to initiate using the acquired ABS pattern for timing of communications based on the acquired ABS information; and (2) schedule transmission or reception based on the ABS pattern, responsive to a determination to initiate using the acquired ABS pattern.

In one embodiments, a wireless access point (WAP) configured to communicate with a wireless transmit/receive unit (WTRU), the WAP configured to use an almost blank subframe (ABS) pattern, may comprise:

a transmit/receive unit configured to receive information indicating the ABS pattern with a plurality of ABS intervals of an interfering cell; and a processor configured to determine timing associated with the ABS intervals of the interfering cell in accordance with the indicated ABS pattern; and to schedule a transmission opportunity during the ABS intervals of the interfering cell, wherein the transmit/receive unit may be configured to send at least one of: one or more system information blocks, a master information block; or a paging message in accordance with the scheduled transmission opportunity.

In some embodiments, the transmit/receive unit may be configured to receive an ABS identifier that uniquely identifies the ABS pattern; and the processor may be configured to look up the ABS identifier to determine the ABS pattern, and that determines subsequent intervals associated with the interfering cell that are the ABS intervals.

In some embodiments, the processor may be configured to include the ABS pattern in the system information block; and the transmit/receive unit may be configured to send the system information block to the WTRU.

In some embodiments, the transmit/receive unit may be configured to send the information indicating a common ABS pattern associated with any cells of a first type.

In one embodiment, a wireless access point (WAP) configured to communicate with a wireless transmit/receive unit (WTRU), the WAP configured to use an almost blank subframe (ABS) pattern, may comprise: a transmit/receive unit configured to receive information indicating one ABS pattern of a plurality of ABS patterns; and a processor configured to: (1) determine timing of paging occasions for paging the WTRU in accordance with ABS intervals of the indicated ABS pattern, wherein the transmit/receive unit may be configured to send paging messages during the determined timing of the paging occasions.

In some embodiments, a non-transitory computer readable medium may store program code executable on a computer for implementing one or more of the methods.

What is claimed is:

1. A method of scheduling operations by a wireless transmit/receive unit (WTRU) using an almost blank subframe (ABS) pattern, comprising:
   determining, by the WTRU, that a communication for exchange with the WTRU is being interfered by another communication from a neighboring cell; and
   acquiring, by the WTRU, ABS information indicating at least one ABS pattern with a plurality of ABS intervals of an interfering cell or at least one subset of the ABS pattern with one or more of the plurality of ABS intervals, the ABS intervals indicating measurement restrictions or communication opportunities associated with the ABS intervals.

2. The method of claim 1, wherein the acquiring of the ABS information indicating at least one subset of the ABS pattern includes receiving, by the WTRU, the ABS information associated with one or more measurement restriction patterns.

3. The method of claim 2, further comprising:
   restricting the WTRU to obtain measurements during one or more subframes based on the ABS interval or intervals indicated by the acquired ABS information.

4. The method of claim 3, further comprising:
   receiving an indication to initiate the measurements according to a measurement restriction pattern; and
   initiating, by the WTRU, the measurements based on the received indication.

5. The method of claim 2, further comprising:
   determining, by the WTRU, timing associated with the ABS intervals of the interfering cell in accordance with the indicated ABS patterns or indicated measurement restriction patterns.

6. The method of claim 1, further comprising:
   scheduling, by the WTRU, a measurement opportunity, a transmission opportunity or a reception opportunity during the ABS intervals of the interfering cell.

7. The method of claim 1, further comprising:
   operating the WTRU in idle mode; and
   sending, by the WTRU to a serving cell, a report indicating an interference condition.

8. The method of claim 1, further comprising:
   receiving an indication to change paging message detection times for detection of a paging message; and
   changing, by the WTRU, the paging message detection times based on the received indication.

9. The method of claim 1, further comprising:
   performing measurements on one of: (1) a serving cell on allowed subframes received in a serving cell measurement restriction pattern; or (2) a neighboring cell or a set of neighboring cells on the allowed subframes indicated in an acquired neighboring cell measurement restriction pattern.

10. The method of claim 1, further comprising:
changing paging message detection times for detection of a paging message;
awakening the WTRU prior to the changed paging message detection times; and
detecting, by the WTRU, the paging message after the WTRU is awakened.

11. The method of claim 10, wherein the awakening of the WTRU includes:
awakening of the WTRU in: one of: (1) a plurality of consecutive subframes based on paging messages scheduled to be sent by the serving cell to the WTRU prior to one or more paging occasions corresponding to the plurality of consecutive subframes; or (2) a next subframe or a first non-interfered sub-frame after a last paging occasion within a paging frame to receive the paging message.

12. The method of claim 10, wherein the changing of the paging message detection times include changing the paging message detection times according to a set of parameters received by the WTRU when an interference condition is detected.

13. The method of claim 1 wherein the determining that the WTRU is being interfered by the neighboring cell includes detecting that an interference condition exists when a quality of the neighboring cell becomes better than a quality of a serving cell by a threshold.

14. The method of claim 13, wherein the determining that the WTRU is being interfered by the neighboring cell further includes establishing at least one of: (1) the WTRU is not allowed to reselect to the neighboring cell; or (2) the quality of the neighboring cell has been better than the quality of the serving cell for at least a threshold period.

15. The method of claim 1, further comprising:
detecting, by the WTRU, that the WTRU is no longer in a vicinity of the interfering cell, as a detection result; and
stopping, by the WTRU, an application of the ABS pattern in accordance with the detection result.

16. The method of claim 1, wherein the determining that the WTRU is being interfered by the neighboring cell includes detecting that an interference condition exists when a cell reselection criteria is met for a non-allowed closed subscriber group (CSG) cell.

17. A method of scheduling operations by a wireless transmit/receive unit (WTRU) using an almost blank subframe (ABS) pattern, comprising:
receiving, by the WTRU, ABS information indicating the ABS pattern with a plurality of ABS intervals of an interfering cell;
determining, by the WTRU, timing associated with the ABS intervals of the interfering cell in accordance with the indicated ABS pattern; and
scheduling, by the WTRU, a measurement opportunity, a transmission opportunity or a reception opportunity, in accordance with the determined timing associated with the ABS intervals of the interfering cell.

18. A method of managing operation of a wireless transmit/receive unit (WTRU) served by a serving cell in a vicinity of a further cell, the method comprising:
determining, by the WTRU, whether the further cell is interfering with communications between the WTRU and the serving cell; and
in response to a determination that the further cell is interfering with the communications, (1) determining a subset of an ABS pattern of subframes and a timing offset of the further cell; (2) notifying, by the WTRU, the serving cell of the subset of the ABS pattern of the subframes and the timing offset of the further cell; and (3) operating, by the WTRU in a first mode in accordance with the determined subset of the ABS pattern and the timing offset of the further cell.

19. The method of claim 18, further comprising:
coordinating, by the WTRU, relative to the further cell at least one of: (1) wake-up of the WTRU from power down intervals; (2) transmission of signaling; (3) reception of signaling; or (4) measurement of channel quality, responsive to operating in the first mode.

20. The method of claim 18, further comprising:
in response to a determination that the further cell is not interfering with the communications, operating, by the WTRU, in a second mode in which transmission of signaling, reception of signaling and measurement of channel quality are uncoordinated relative to the further cell.

21. A method of scheduling transmission or reception by a wireless transmit/receive unit (WTRU) using almost blank subframe (ABS) patterns, the method comprising:
acquiring, by the WTRU, ABS information of a target cell indicating a subset of an ABS pattern having a plurality of ABS intervals;
determining, by the WTRU, whether to initiate using the indicated subset of the ABS pattern for timing of communications based on the acquired ABS information; and
scheduling, by the WTRU, a measurement, a transmission or a reception based on the subset of the ABS pattern, responsive to initiating usage of the indicated subset of the ABS pattern.

22. The method of claim 21, wherein the determining of whether to initiate using the acquired ABS pattern for timing of communications includes:
establishing one or more triggering events or triggering conditions, as a trigger, to initiate using the indicated ABS pattern based on the acquired ABS information, the method further comprising:
scheduling, by the WTRU, measurement opportunities, transmission opportunities or reception opportunities regardless of timing of the ABS intervals of an interfering cell, prior to an event or a condition satisfying the trigger; and
scheduling, by the WTRU, the measurement opportunities, reception of master information blocks, or reception of system information blocks during timing of the ABS intervals of the interfering cell, subsequent to the event or the condition satisfying the trigger.

23. A wireless transmit/receive unit (WTRU) configured to use an almost blank subframe (ABS) pattern, comprising:
a processor configured to determine that the WTRU is being interfered by a neighboring cell; and
a transmit/receive unit configured to acquire ABS information indicating: (1) at least one ABS pattern with a plurality of ABS intervals of an interfering cell; or (2) at least one subset of the ABS pattern with one or more of the plurality of ABS intervals, the ABS intervals indicating measurement restrictions or communication opportunities associated with the ABS intervals.

24. The WTRU of claim 23, wherein the processor is configured to restrict the WTRU to obtain measurements during one or more subframes based on the ABS interval or intervals indicated by the ABS information acquired by the transit/receive unit.

25. The WTRU of claim 23, wherein when the processor operates in idle mode, the transmit/receive unit sends to a serving cell a report indicating any interference condition.

26. The WTRU of claim 23, wherein responsive to the transmit/receive unit receiving an indication to initiate measurements according to a measurement restriction pattern, the processor initiates measurements based on the received indication.

27. The WTRU of claim 23, wherein responsive to the transmit/receive unit receiving an indication to change paging message detection times for detection of a paging message, the processor changes the paging message detection times based on the received indication.

28. A wireless transmit/receive unit (WTRU) using almost blank subframe (ABS) patterns, comprising:
- a transmit/receive unit configured to acquire ABS information of a target cell indicating an ABS pattern having a plurality of ABS intervals; and
- a processor configured to: (1) determine whether to initiate using the indicated ABS pattern for timing of communications based on the acquired ABS information; and (2) schedule, based on the indicated ABS pattern, one of: (i) a measurement, (ii) a transmission or (iii) a reception, responsive to a determination to initiate using the acquired ABS pattern.

* * * * *